United States Patent
Collison et al.

(10) Patent No.: US 9,824,354 B1
(45) Date of Patent: Nov. 21, 2017

(54) METHOD AND APPARATUS FOR PERFORMING TRANSACTIONS OVER A NETWORK USING CROSS-ORIGIN COMMUNICATION

(71) Applicant: Stripe, Inc., San Francisco, CA (US)

(72) Inventors: Patrick Collison, San Francisco, CA (US); John B. Collison, San Francisco, CA (US); Greg D. Brockman, San Francisco, CA (US); Saikat Chakrabarti, New York, NY (US); Ross A. Boucher, New York, NY (US)

(73) Assignee: STRIPE, INC., San Francisco, CA (US)

( * ) Notice: Subject to any disclaimer, the term of this patent is extended or adjusted under 35 U.S.C. 154(b) by 0 days.

(21) Appl. No.: 15/251,907

(22) Filed: Aug. 30, 2016

Related U.S. Application Data

(62) Division of application No. 13/664,808, filed on Oct. 31, 2012.

(Continued)

(51) Int. Cl.
*G06Q 20/38* (2012.01)
*G06Q 20/10* (2012.01)
*G06Q 20/40* (2012.01)

(52) U.S. Cl.
CPC ........ *G06Q 20/3829* (2013.01); *G06Q 20/102* (2013.01); *G06Q 20/385* (2013.01); *G06Q 20/4097* (2013.01)

(58) Field of Classification Search
USPC .......................................................... 705/44
See application file for complete search history.

(56) References Cited

U.S. PATENT DOCUMENTS 7,113,930 B2 * 9/2006 Eccles ................... G06Q 20/02
  705/1.1
8,505,106 B1 * 8/2013 Bhosle ................. H04L 9/3213
  709/206

(Continued)

OTHER PUBLICATIONS

Office Action for counterpart U.S. Appl. No. 13/664,808, 19 pages, dated Jan. 4, 2017.

*Primary Examiner* — Robert R Niquette
*Assistant Examiner* — William J Jacob
(74) *Attorney, Agent, or Firm* — Blakely, Sokoloff, Taylor & Zafman LLP

(57) ABSTRACT

A transaction is conducted between a merchant site and a customer's electronic device using a payment processor. The merchant site is associated with a client-side application and a server-side application. The client-side application executes on the customer's electronic device. The client-side application electronically sends payment information retrieved from the customer's electronic device to the payment processor. The client-side application does not send the payment information to the server-side application. The payment processor creates a token from the payment information sent by the client-side application. The token functions as a proxy for the payment information. The payment processor electronically sends the token to the client-side application. The client-side application electronically sends the token to the server-side application for use by the server-side application in conducting the transaction. The payment information can thus be used by the server-side application via the token without the server-side application being exposed to the payment information.

21 Claims, 9 Drawing Sheets

Related U.S. Application Data

(60) Provisional application No. 61/554,246, filed on Nov. 1, 2011.

(56) References Cited

U.S. PATENT DOCUMENTS

| | | | | |
|---|---|---|---|---|
| 2003/0200184 A1* | 10/2003 | Dominguez | ........... | G06Q 20/02 705/78 |
| 2005/0222961 A1* | 10/2005 | Staib | ................... | G06Q 20/327 705/64 |
| 2006/0235796 A1* | 10/2006 | Johnson | ................ | G06Q 20/02 705/44 |
| 2009/0023474 A1* | 1/2009 | Luo | ....................... | G06Q 20/32 455/557 |
| 2009/0048979 A1 | 2/2009 | Al-Herz et al. | | |
| 2009/0060199 A1* | 3/2009 | von Mueller | ........ | G06Q 20/085 380/278 |
| 2009/0276835 A1* | 11/2009 | Jackson | ................. | G06F 21/54 726/4 |
| 2010/0107088 A1* | 4/2010 | Hunt | ..................... | G06Q 10/10 715/752 |
| 2010/0327054 A1* | 12/2010 | Hammad | ................. | G06F 21/34 235/375 |
| 2011/0065420 A1* | 3/2011 | Reyes | ..................... | G06F 21/10 455/411 |
| 2011/0246772 A1* | 10/2011 | O'Connor | ........... | H04L 63/0428 713/168 |
| 2011/0276418 A1* | 11/2011 | Velani | ..................... | G06Q 20/20 705/16 |
| 2011/0276479 A1* | 11/2011 | Thomas | ............... | G06Q 20/102 705/40 |
| 2012/0016731 A1* | 1/2012 | Smith | .................... | G06Q 20/20 705/14.33 |
| 2012/0016799 A1* | 1/2012 | Killian | .................. | G06Q 20/20 705/44 |
| 2012/0173431 A1* | 7/2012 | Ritchie | ................ | G06Q 20/367 705/65 |
| 2012/0317238 A1* | 12/2012 | Beard | .................... | H04L 63/10 709/219 |
| 2013/0031462 A1* | 1/2013 | Calvo | .................... | G06F 9/545 715/234 |

\* cited by examiner

Fig. 6

The company

Company legal name
[Company, Inc.]

What is the company known as?
[company.com]
This is what will appear on your customers' statements. Don't worry, you can change it later.

Company type
[Corporation ⇕]

EIN (Tax ID)
[          ]
Don't have one yet? Apply online. (sadly, the website has opening hours. Really.)

Company address
[address]
[city] [AK ⇕] [Zip]

Company phone
[          ]
This will appear on your customers' statements. Don't worry, you can change it later.

Bank Details
[Routing no] [Account no]
Routing number  Account number

You, the company representative
You should be able to sign agreements on behalf of your company.

Full name
[First] [Last]

Position
[Founder/Owner ⇕]

Date of birth
[MM][DD][YYYY]

SSN
[          ]
Why do we need your SSN when you're signing up as a company? We use it to verify the rest of the information given.

Home address
[address]
[city] [AK ⇕] [Zip]

I agree to Stripe's terms of service.

[Save for later] [Submit and activate]

Account details

Email address

Password

Password (again)

Your info     220

First name

Last name

Company

Billing info     220     SECURE

Card number

CVC

Expiration  01 / 2011

Got a coupon code?

*Fig. 8*

METHOD AND APPARATUS FOR PERFORMING TRANSACTIONS OVER A NETWORK USING CROSS-ORIGIN COMMUNICATION

CROSS-REFERENCE TO RELATED APPLICATIONS

This application is a divisional of U.S. patent application Ser. No. 13/664,808, filed Oct. 31, 2012, which claims priority to U.S. Provisional Patent Application No. 61/554,246 filed Nov. 1, 2011, which is incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

Embodiments of the present invention relate to network communication; more particularly, embodiments of the present invention relates to using cross-origin communication for completing transactions on a network.

BACKGROUND OF THE INVENTION

Traditionally, merchants looking to accept payments online are forced to trade off between the level of control over their customers' experience and the amount of investment required to accept payments online.

Some merchants choose to minimize their investment by working with third parties to handle all their payment needs. In these cases, the merchants redirect their customers to the third party, which is responsible for capturing the payment information and processing the transaction. The third party will later pay the merchants for successful transactions under the terms previously agreed upon. While simple, this approach results in a very poor user experience. Customers are redirected from the merchant site to the third party site (where they are often required to login or create a new account), causing confusion and customer abandonment. This flow also makes it difficult to handle changes to customer orders or to upsell customers on new products post purchase.

Merchants looking to have more control over their customers' user experience usually invest time and money to build their own payment infrastructure. This usually requires that the merchant capture payment information from their customers and send it to a third party payment gateway for real-time authorization of transactions and subsequent settlement of funds. This approach allows merchants to build the entire payment flows on their site. However, this approach requires that the companies implement systems and policies to ensure the secure handling, transmission, and storage of their customers' sensitive payment information. These systems and policies must also be in compliance with the credit card networks as defined by various standards such as PCI Security Standard. Furthermore, merchants are liable for the protection and security of their customers' information.

Some of the payment gateways offer credit card storage services to reduce merchants' exposure to sensitive data. These gateways offer tokenization technology whereby a merchant can submit sensitive payment information to the gateway and receive a token that serves as a proxy for the sensitive payment data and can be securely stored in the merchant's systems to execute subsequent charges. While this approach reduces some of the requirements and liabilities associated with storing sensitive payment data, it still requires that the merchant handle and transmit sensitive payment information prior to receiving the token from the gateway. Thus, the merchant is still responsible for ensuring that their systems and policies are secure enough to handle this type of information and comply with all the industry data protection standards.

BRIEF SUMMARY OF THE INVENTION

Stripe.js provides merchants with a set of technologies that can be easily and quickly integrated to securely accept payments online. With Stripe.js, merchants retain full control of their customers' payment flows but their servers are never exposed to sensitive payment information.

When added to a merchant's payment form, Stripe.js automatically intercepts the payment form submission, sending payment information directly to Stripe and converting it to a Single-use Token. The Single-use Token can be safely passed to the merchant's systems and used later to charge customers. Merchants have complete control of their customer's payment experience without ever handling, processing, or storing sensitive payment information.

At a high level, Stripe.js works as follows (FIG. 1.):

1. The Merchant's Customer (200) uses an internet-enabled browser (210) to visit the Merchant's site. Customer is served a Stripe.js enabled Payment Form (110) using standard web technologies (see FIG. 8 for sample forms). The Customer (200) enters the necessary information including their Payment Information (220) and submits the Payment Form (110). The Billing Info portion of the Payment Form (110) is for payment via a credit card or debit card. If payment is to be made via an Automated Clearinghouse (ACH) transaction, the Billing Info portion of the Payment Form (110) will request a bank routing number and an account number within that bank, and possibly additional information, such as the bank name and whether the account is a checking or savings account.

2. The Customer's payment information (220) is sent from the Customer's browser (210) to Stripe (300), never touching the Merchant's Servers (120). In this manner, the client-side application electronically sends payment information retrieved from the customer's electronic device to the payment processor. The client-side application does not send the payment information (220) to the server-side application.

3. In one preferred embodiment, Stripe (300) submits the relevant transaction to a Processor (400) or directly to the Card Network (500) for authorization or validation of the payment information. The Card Network (500) sends the request to the Card Issuing Bank (600), which authorizes the transaction. In this embodiment, Stripe (300) and Processor (400)/Card Network (500) function together as a payment processor. In another preferred embodiment, this step is performed without any communication to the Processor (400)/Card Network (500). Instead, Stripe (300) performs its own authorization or validation of the payment information using heuristic means, such as by checking the Bank Identification Number (BIN), also referred to as the Issuer Identification Number (IIN), against a database of known valid BINs that is on file with Stripe (300). (The BIN is a part of the bank card number, namely the first six digits.) In yet another preferred embodiment, this step is not performed at all since the authorization or validation is not necessary for the next step 4 to succeed. That is, it is acceptable to create a Single-use Token in step 4 that represents payment information which has not been validated in any way.

4. If authorized, Stripe (300) will generate and return a secure, Single-use Token (350) to the Customer's Browser (210) that represents the customer's payment information (220) but doesn't leak any sensitive information. In the preferred embodiment wherein step 3 is not performed, Stripe (300) performs this step without waiting to receive authorization from the Processor (400) or the Card Network (500). In this manner, the payment processor (here, Stripe (300)) creates the Token (350) from the payment information sent by the client-side application, wherein the Token (350) functions as a proxy for the payment information (220).

5. The Payment Form (110) is submitted to Merchant Servers (120), including the Single-use Token (350). More specifically, the payment processor sends the Token (350) to the client-side application, which, in turn, sends the Token (350) to the server-side application for use by the server-side application in conducting the transaction.

6. The Merchant (100) uses the Single-use Token (350) to submit a charge request to Stripe (or to create a Customer object for later use). In this step, Stripe submits a request to authorize the charge to the Processor (400) or directly to the Card Network (500). This authorization specifies the actual amount to charge the credit card. If an authorization was already done in step 3 for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1-6, the payment information can be used by the server-side application via the Token (350) without the server-side application being exposed to the payment information.

7. Stripe (300) settles the charge on behalf of the Merchant (100) with the Processor (400) or directly with the Card Network (500).

8. The Card Network (500) causes the funds to be paid by the Card Issuing Bank (600) to Stripe (300) or to Stripe's Acquiring Bank (700).

9. Stripe (300) causes the settled funds to be sent to the Merchant (100) (or to the Merchant's Bank (800)), net of any applicable fees.

10. The Card Issuing Bank (600) collects the paid funds from the Customer (200).

Not all of the steps listed above must happen in real-time. Typically, when the Merchant's Customer submits the payment form in step 1, steps 1 through 6 happen in real-time and steps 7-10 happen later, usually once per day, as a batch process settling all of the funds for all of Stripe's merchants.

As discussed in more detail below, the payment processor uses an http-based tokenization API for use in steps 2 and 4 above.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIGS. 2-5 show message sequence diagrams for implementing preferred embodiments of the present invention.

FIGS. 6, 7*a*, 7*b* and 8 show user interface display screens in accordance with preferred embodiments of the present invention.

DETAILED DESCRIPTION OF THE INVENTION

Figure 1:
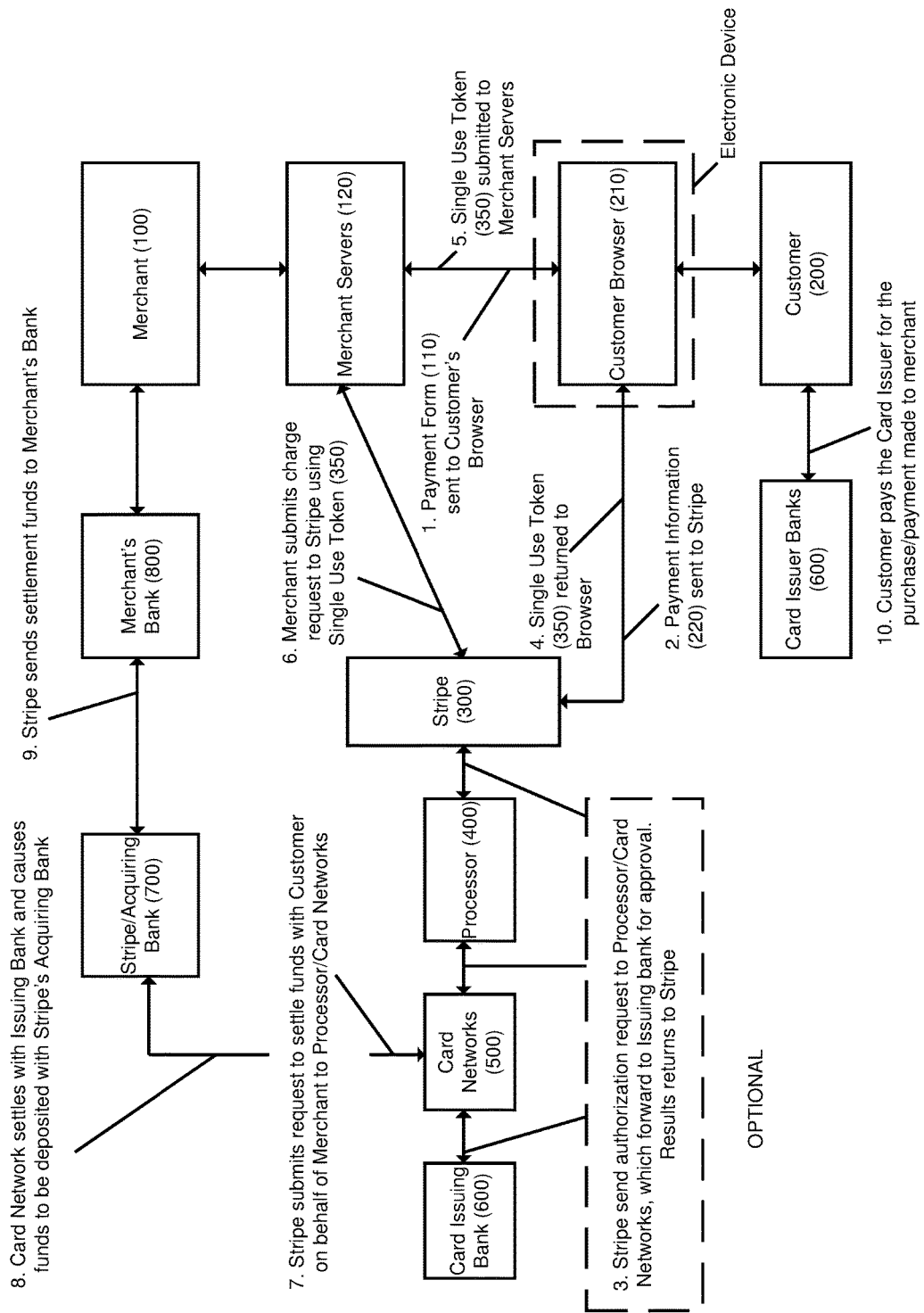
FIGS. 1 and 2 show flowchart of the steps and entities for implementing preferred embodiments of the present invention.

Certain terminology is used herein for convenience only and is not to be taken as a limitation on the present invention.

The present invention is described in the context of an online payment acceptance service called Stripe™ commercialized by Stripe, Inc., San Francisco, Calif.

The following definitions are provided to promote understanding of the present invention.

Card Network (or Card Association)—refers to financial payment networks such as Visa®, MasterCard®, American Express®, Diners Club®, JCB® and China UnionPay®.

Processor—A processor, also referred to herein as "processor (400)," is a company (often a third party) appointed to handle credit card transactions. They have connections to various card networks and supply authorization and settlement services to merchants or payment service providers. They can also move the money from the issuing bank to the merchant or acquiring bank.

Acquiring Bank—An acquiring bank (or acquirer) is the bank or financial institution that accepts credit and or debit card payments from affiliated card networks for products or services on behalf of a merchant or payment service provider.

Card Issuing Bank—A card issuing bank is a bank that offers card network or association branded payment cards directly to consumers. The issuing bank assumes primary liability for the consumer's capacity to pay off debts they incur with their card.

Payment Information—In one preferred embodiment for making payment via a credit card or debit card, the payment information includes primary account number (PAN) or credit card number, card validation code, expiration month and year. In another preferred embodiment for making payment via an Automated Clearinghouse (ACH) transaction, the payment information includes a bank routing number and an account number within that bank. The payment information includes at least some sensitive, non-public information.

Merchant—A merchant, as used herein, is an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

Merchant Site—The merchant site is the e-commerce site (e.g., website) of the merchant. The merchant (100) and merchant server (120) in the figures are associated with the merchant site. The merchant site is associated with a client-side (client side) application and a server-side (server side) application. In one preferred embodiment, the merchant site includes Merchant Server (120), and the server-side application executes on the Merchant Server (120).

Customer's Electronic Device—This is the device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native app installed onto the customer's device. The client-side application executes on the customer's electronic device.

Payment Processor—A payment processor, as referred to herein, is an entity or a plurality of entities that facilitate a transaction between a merchant site and a customer's electronic device. The payment processor includes selected functionality of both Stripe (300) and Processor (400)/Card Networks (500). For example, Stripe (300) creates tokens and maintains and verifies publishable (non-secret) keys and secret keys. The Processor (400)/Card Networks (500) is involved in authorizing or validating payment information. In one preferred embodiment, Stripe (300) and the Processor (400)/Card Networks (500) function together to authorize and validate payment information, issue a token, and settle any charges that are made. Accordingly, in this embodiment, the payment processor refers to the functionality of Stripe (300) and the functionality of the Processor (400)/Card Networks (500). In another preferred embodiment wherein step 3 in the high level description is not performed, and Stripe (300) performs its own verification before issuing a token, the Processor (400)/Card Networks (500) are still used for settling any charges that are made, as described in step 7 in the high level description. Accordingly, in this embodiment, the payment processor may refer only to the functionality of Stripe (300) with respect to issuing tokens.

Native Application—A Native Application or "native app" is an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet which requires interpreter software. A native application also differs from an emulated application that is written for a different platform and converted in real time to run, and also differs from a Web application that is run within the browser.

I. Getting a Stripe Account

Figure 6:
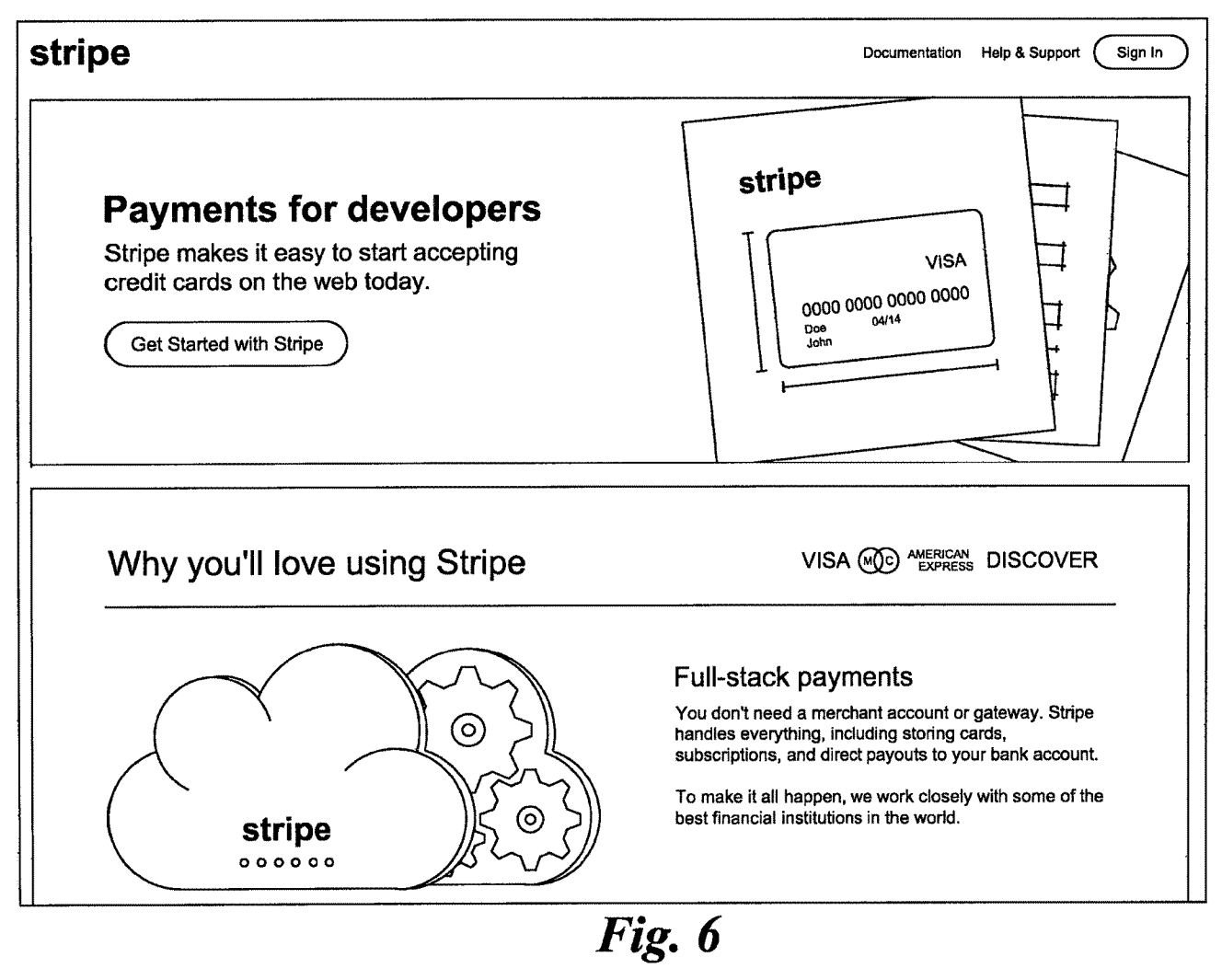
Figure 7A:
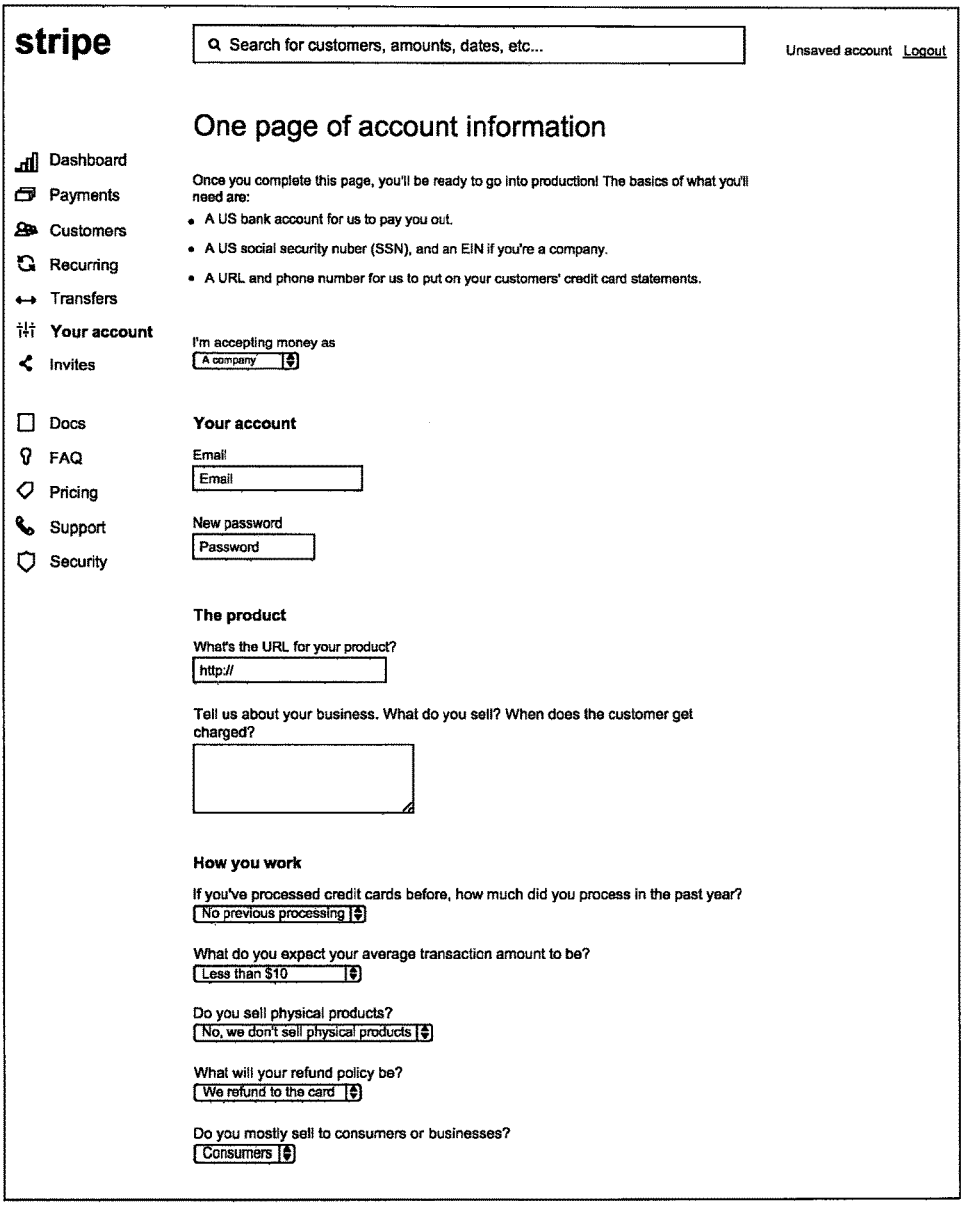

A Merchant (100) visits https://stripe.com from any internet-enabled browser (see FIG. 6) to sign up for an account. Merchants can begin the process of integration (including test transactions) immediately. However, prior to processing live transactions, Merchants must submit an account application requesting some basic information about the Merchant's product, business, and the applicant's personal relationship to the business (see FIG. 7*a*, 7*b*).

II. Stripe.js Client-Side

A. Setting Up a Payment Form to Use Stripe.js

1. A Merchant (100) creates a Payment Form (110) that will be presented to their Customers (200) when payment is required. Below is a sample form that will be used to illustrate how to use Stripe.js:

```
<form action=" " method="POST" id="payment-form">
  <div class="form-row">
    <label>Card Number</label>
    <input type="text" size="20" autocomplete="off" class="card-number"/>
  </div>
  <div class="form-row">
    <label>CVC</label>
    <input type="text" size="4" autocomplete="off" class="card-cvc"/>
  </div>
  <div class="form-row">
    <label>Expiration (MM/YYYY)</label>
    <input type="text" size="2" class="card-expiry-month"/>
    <span> / </span>
    <input type="text" size="4" class="card-expiry-year"/>
  </div>
  <button type="submit" class="submit-button">Submit Payment</button>
</form>
```

The input fields representing sensitive payment data (220) do not have a "name" attribute. This prevents them from hitting the Merchant's Servers (120) when the Payment Form (110) is submitted.

2. The Merchant (100) adds Stripe.js in the Payment Form (110):

```
<script type="text/javascript" src="https://js.stripe.com/v1/"></script>
```

In a separate script tag, the Merchant (100) will include their Publishable Key (see Appendix I: Keys and Authentication).

```
<script type="text/javascript">
  // this identifies your website in the createToken call below
  Stripe.setPublishableKey('YOUR_PUBLISHABLE_KEY');
  ...
</script>
```

Stripe.setPublishableKey(..) identifies the Merchant (100) when communicating with Stripe (300).

3. The Merchant (100) will also add an event handler to the Payment Form (110) to capture the submit event. This stops the Payment Form (110) from being submitted to the Merchant's Server (120), while it waits for Stripe (300) to tokenize the Payment Information (220).

```
$(document).ready(function( ) {
  $("#payment-form").submit(function(event) {
    // disable the submit button to prevent repeated clicks
    $('.submit-button').attr("disabled", "disabled");
    var amount = 1000; //amount you want to charge in cents
    Stripe.createToken({
      number: $('.card-number').val( ),
      cvc: $('.card-cvc').val( ),
      exp_month: $('.card-expiry-month').val( ),
      exp_year: $('.card-expiry-year').val( )
    }, amount, stripeResponseHandler);
    // prevent the form from submitting with the default action
    return false;
  });
});
```

Note: In this example, jQuery's val( ) is used to retrieve values entered in the Payment Form (110). Using jQuery isn't necessary—standard Document Object Model (DOM) methods may alternatively be used to retrieve card data from your Payment Form (110).

Appendix II shows an example of a complete payment page.

B. Stripe.createToken

In the event handler, the call, Stripe.createToken, converts Payment Information (220) to a Single-use Token (350) which the Merchant (100) can then safely pass to their Servers (120) to charge their Customer (220). createToken is an asynchronous call—it returns immediately and invokes stripeResponseHandler when it receives a response from Stripe (300).

```
Stripe.createToken({
    number: $('.card-number').val( ),
    cvc: $('.card-cvc').val( ),
    exp_month: $('.card-expiry-month').val( ),
    exp_year: $('.card-expiry-year').val( )
}, amount, stripeResponseHandler);
```

The first argument to createToken is a Javascript object containing Payment Information (220) entered by the Merchant's Customer (200).

It should contain the following required fields:
  (i) number: card number as a string without any separators, e.g. '4242424242424242'.
  (ii) exp_month: two digit number representing the card's expiration month, e.g. 12.
  (iii) exp_year: four digit number representing the card's expiration year, e.g. 2013.

The following fields are optional but recommended:
  (i) cvc: card security code as a string, e.g. '123'.
  (ii) address_line1: billing address_line 1.
  (iii) address_zip: billing zip as a string, e.g. '94301'.

The following fields are entirely optional—they are not used in card validation:
  (i) name: cardholder name.
  (ii) address_line2: billing address_line 2.
  (iii) address_state: billing address_state.
  (iv) address_country: billing address_country.

The second argument amount is the amount the Merchant (100) wants to charge their Customer (200), in cents. So 1000 is $10.00 and 99 is $0.99. This parameter can be left out if the amount at the time of card entry is not known (for example in some recurring billing scenarios or initial card validation).

The third argument stripeResponseHandler is a callback the Merchant (100) provides to handle the subsequent response from Stripe (300). It should do the following:
  (i) If the card information entered by the Customer (200) returned an error, display it on the page.
  (ii) If no errors were returned (i.e. a Single-use Token (350) was created successfully), add the returned Single-use Token (350) to the Payment Form (110) and submit the form to the Merchant's Server (120).

Here is a sample implementation of stripeResponseHandler:

```
function stripeResponseHandler(status, response) {
    if (response.error) {
        ...
        //show the errors on the form
        $(".payment-errors").html(response.error.message);
    } else {
        var form$ = $("#payment-form");
        // token contains id, last4, and card type
        var token = response['id'];
        // insert the token into the form so it gets submitted to the server
        form$.append("<input type='hidden' name='stripeToken' value='" + token + "'/>");
        // and submit
        form$.get(0).submit( );
    }
}
```

Status is one of the status codes described in the API documentation (see Appendix V).

Response is of the following form (for a successful authorization):

```
{
    id: "tok_u5dg20Gra", // String of token identifier,
    amount: 100, // Integer amount token was created for in cents
    card: {...},// Dictionary of the card used to create the token
    created: 1319235163, // Integer of date token was created
    currency: "usd", // String currency that the token was created in
    livemode: true, // Boolean of whether this token was created with a live or test API key
    object: "token", // String identifier of the type of object, always "token"
    used : false, // Boolean of whether this token has been used,
}
```

In order to add the Single-use Token (350) to the information submitted to the Merchant's Server (120), a new input tag is added into the Payment Form (110), and its value is set to the id of the Single-use Token (350).

After the Single-use Token (350) is added to the Payment Form (110), it posts the form data, without Payment Information (220), to the Merchant's Servers (120). Submit( ) is called on the form directly, rather than the jQuery wrapper, to avoid an infinite loop. The data will be sent as an HTTP POST to the URL in the form's action.

C. Client-Side Validation

Stripe.js also provides a number of client side validation helpers (see Appendix III).

III. Generating a Single-Use Token—Server Side

This section explains the detailed flows and entities that generate a Single-use Token (350) from Payment Information (220).

Figure 2:
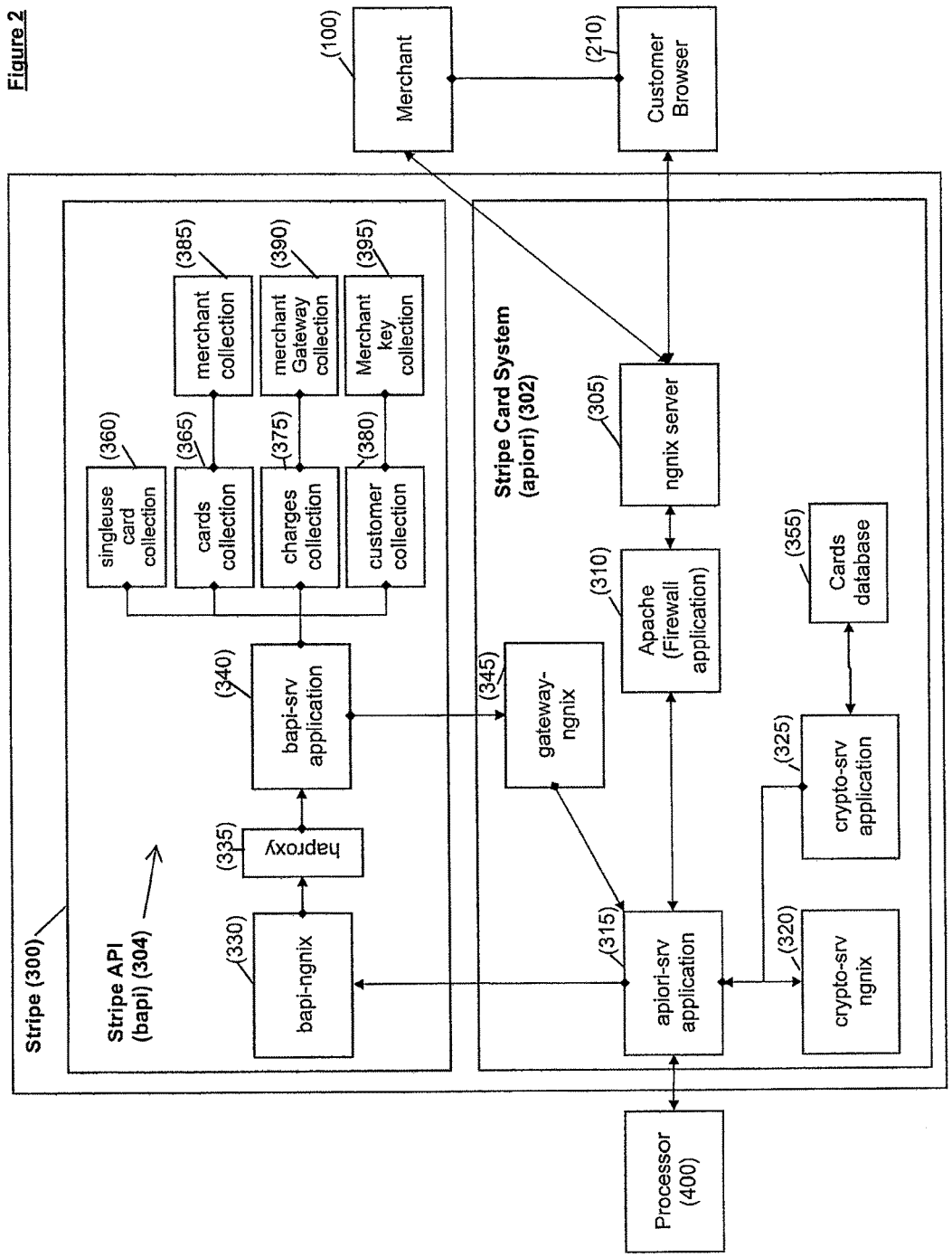
Figure 3:
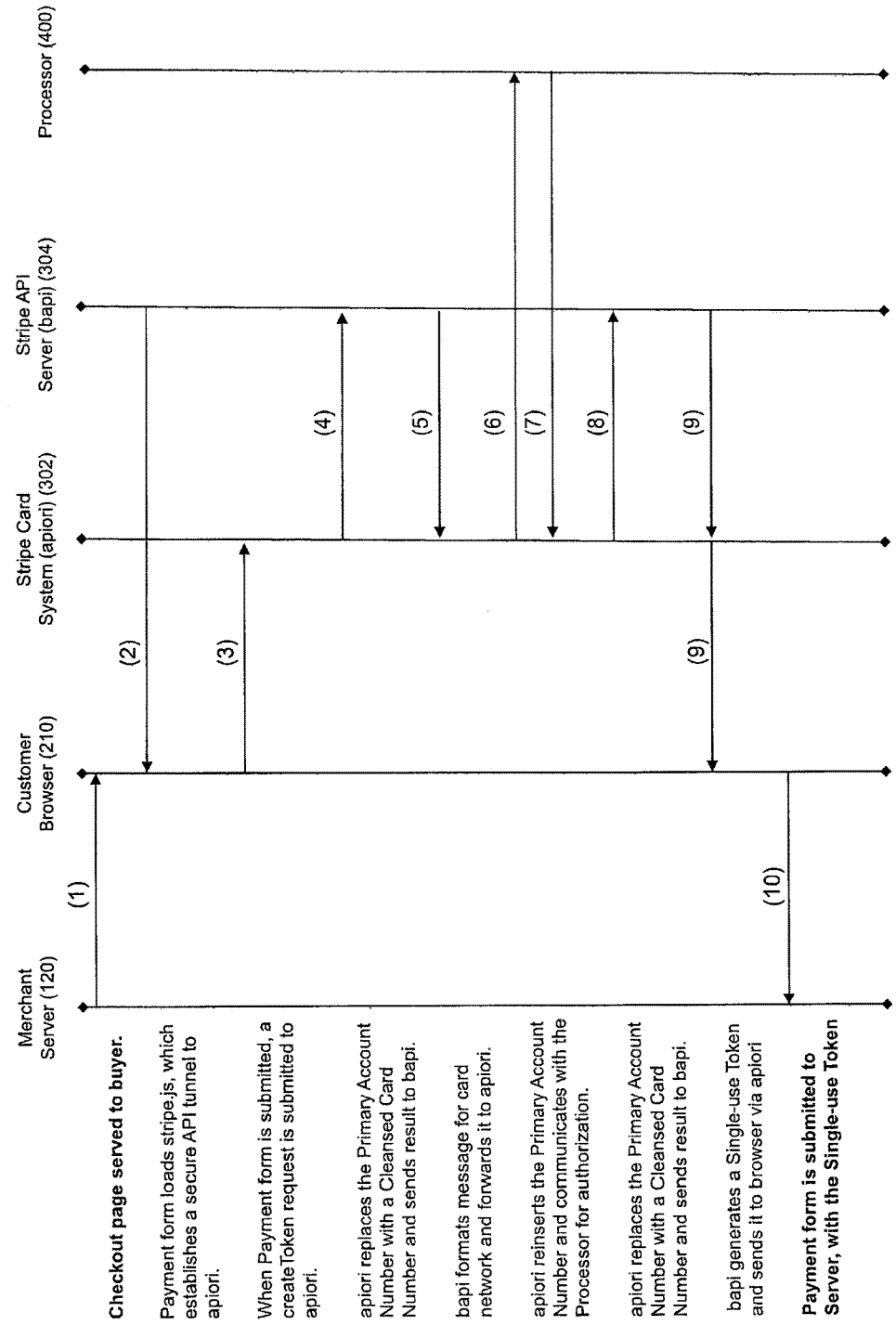

(Please refer to FIG. 2 and FIG. 3. Referring to FIGS. 2-5, Stripe (300) includes Stripe API Server (bapi) (304) and Stripe Card System (apriori) (302)).

FIG. 3. #1:

The Merchant Servers (120) serve a Stripe.js enabled Payment Form (110) to the Merchant Customer's Browser (210).

FIG. 3. #2:

Stripe.js establishes a secure API tunnel to Stripe API Server (bapi) (304) of Stripe (300). When the Merchant's Payment Form (110) with Stripe.js first loads, it creates an iframe with URL https://api.stripe.com/js/v1/apitunnel.html:

```
API Tunnel
" " "
    function loadAPITunnel( ) {
        tunnel = null;
        var body = document.getElementsByTagName("body")[0];
        var tunnelIframe = document.createElement('iframe');
        stripeFrameId = 'stripeFrame' + (new Date( ).getTime( ));
        tunnelURL = transport['apiURL'] +'/js/v1/apitunnel.html' ;
        var url = tunnelURL + '#' +encodeURIComponent
            (window.location.href);
```

```
       API Tunnel tunnelIframe.setAttribute('src', url);
    tunnelIframe.setAttribute('name', stripeFrameId);
    tunnelIframe.setAttribute('id', stripeFrameId);
    tunnelIframe.setAttribute('frameborder', '0');
    tunnelIframe.setAttribute(' scrolling', 'no');
    tunnelIframe.setAttribute('allowtransparency', 'true');
    tunnelIframe.setAttribute('width', '0');
    tunnelIframe.setAttribute('height', '0');
    var loadFunc = function( ) {
        tunnel = window.frames[stripeFrameId];
        consumeCallQueue( );
    };
    // #IECOMPAT uses attachEvent
    if (tunnelIframe['attachEvent'])
        tunnelIframe.attachEvent("onload", loadFunc);
    else
        tunnelIframe.onload = loadFunc;
    body.appendChild(tunnelIframe);
};
" " "
```

Once created, messages are sent/received to this iframe using xd.postMessage. xd.postMessage provides a browser-agnostic method for communicating with an iframe.

```
" " "
xd['postMessage'] = function(message, targetOrigin, targetURL, target) {
    // It would make more sense to do this check on target than on
    // window, but Firefox 2 does not let the parent window check the
type
    // of the iframe's postMessage property
    if (typeof window === 'undefined')
        return;
    var serializedMessage = serializer['serialize'](message);
    if (typeof window['postMessage'] === 'undefined')
        // We can't access target['location'] directly, so we have to hackily
        // make the URL what we know it to be here
        target['location']['href'] = targetURL + '#' + (+new Date) +
(Math.floor(Math.random( ) * 1000)) + '&' +serializedMessage;
    else
        target['postMessage'](serializedMessage, targetOrigin);
},
" " "
```

FIG. 3. #3:

When the Customer (100) clicks submit on the Payment Form (110), the event handler captures the submit event and initiates the createToken request to Stripe Card System (apriori) (302) of Stripe (300). Stripe.js makes the createToken request to the apitunnel iframe:

```
" " "
    stripe['createToken'] = function(cardInfo, amount, callback) {
        if (typeof amount === 'function') {
            callback = amount;
            amount =0;
        }
        assertPublishableKey( );
        convertParams(cardInfo);
        stripe['transpore']['callAPI']('POST', 'tokens', {'card' : cardInfo,
'amount': amount}, stripe['publishableKey'], callback);
    };
" " "
```

The actual API call is in the postMessage message handler. It posts over SSL. From apitunnel.js:

```
" " "
```

```
    apiTunnel['handleMessage'] = function(message) {
        var messageID = message['id'];
        jx['load'](message['method'], message['url'] + '?' + serializer['serialize']
(message['params']), message['key'], " ", function(status, result) {
            var response = {
                'id' : messageID,
                'status' : status,
                'response' : result
            };
            xd['postMessage'](response, apiTunnel['parentDomain'],
apiTunnel['parentURL'], parent);
        });
    }
" " "
```

The API Tunnel above is used to allow the merchant's client-side application to create a token on Stripe's server. Since the merchant's client-side application is served from a different host than the one on which Stripe's API resides, the communication between the client-side application and Stripe's API is considered cross-origin communication. Cross-origin communication in an AJAX call is not permitted by most browsers. The API Tunnel is one way to enable this since browsers do allow ways to communicate between iframes served from different hosts, and each iframe can communicate with the host it was served from. It is, however, not the only way to achieve cross-origin communication. An alternative approach is to create the token using a JSONP request. Using a JSONP request simplifies the implementation because there is no need to serve up an API tunnel. The host can simply create the token by making a direct call to Stripe's API using AJAX. The call then specifies a callback function to be called with the result of the call. When using JSONP, the API needs to support creating tokens on GET requests instead of just POST requests. The following is an example of how Stripe.js can be written to use JSONP instead of the API tunnel:

```
"""
(function( ) {
    var _this = this;
    this.Stripe = (function( ) {
        function Stripe( ) { }
        Stripe.version = 2;
        Stripe.endpoint = 'https://api.stripe.com/v1';
        Stripe.validateCardNumber = function(num) {
            num = (num + '').replace(/\s+|-/g, '');
            return num.length >= 10 && num.length <= 16 &&
            Stripe.luhnCheck(num);
        };
        Stripe.validateCVC = function(num) {
            num = Stripe.trim(num);
            return /^\d+$/.test(num) && num.length >= 3 &&
            num.length <= 4;
        };
        Stripe.validateExpiry = function(month, year) {
            var currentTime, expiry;
            month = Stripe.trim(month);
            year = Stripe.trim(year);
            if (!/^\d+$/.test(month)) {
                return false;
            }
            if (!/^\d+$/.test(year)) {
                return false;
            }
```

```
    if (!(parseInt(month, 10) <= 12)) {
      return false;
    }
    expiry = new Date(year, month);
    currentTime = new Date;
    expiry.setMonth(expiry.getMonth( ) - 1);
    expiry.setMonth(expiry.getMonth( ) + 1, 1);
    return expiry > currentTime;
  };
  Stripe.cardType = function(num) {
    return Stripe.cardTypes[num.slice(0, 2)] || 'Unknown';
  };
  Stripe.setPublishableKey = function(key) {
    Stripe.key = key;
  };
  Stripe.createToken = function(card, amount, callback) {
    var data, key, value;
    if (amount == null) {
      amount = 0;
    }
    if (!card) {
      throw 'card required';
    }
    for (key in card) {
      value = card[key];
      delete card[key];
      card[Stripe.underscore(key)] = value;
    }
    key = card.key || Stripe.key || Stripe.publishableKey;
    delete card.key;
    data = {
      key: key,
      card: card
    };
    if (typeof amount === 'function') {
      callback = amount;
    } else if (amount > 0) {
      data.amount = amount;
    }
    Stripe.validateKey(data.key);
    return Stripe.ajaxJSONP({
      url: "" + Stripe.endpoint + "/tokens",
      data: data,
      method: 'POST',
      success: function(body, status) {
        return typeof callback === "function" ?
          callback(status, body) : void 0;
      },
      complete: Stripe.complete(callback),
      timeout: 40000
    });
  };
  Stripe.getToken = function(token, callback) {
    if (!token) {
      throw 'token required';
    }
    Stripe.validateKey(Stripe.key);
    return Stripe.ajaxJSONP({
      url: "" + Stripe.endpoint + "/tokens/" + token,
      data: {
        key: Stripe.key
      },
      success: function(body, status) {
        return typeof callback === "function" ?
          callback(status, body) : void 0;
      },
      complete: Stripe.complete(callback),
      timeout: 40000
    });
  };
  Stripe.complete = function(callback) {
    return function(type, xhr, options) {
      if (type !== 'success') {
        return typeof callback === "function" ? callback(500, {
          error: {
            code: type,
            type: type,
            message: 'An unexpected error has occured.\nWe
              have been notified of the problem.'
          }
        }) : void 0;
      }
    };
  };
  Stripe.validateKey = function(key) {
    if (!key || typeof key !== 'string') {
      throw new Error('You did not set a valid publishable
key.\nCall Stripe.setPublishableKey( ) with your publishable
key.\nFor more info, see https://stripe.com/docs/stripe.js');
    }
    if (/ sk_/.test(key)) {
      throw new Error('You are using a secret key with Stripe.js,
instead of the publishable one.\nFor more info, see
https://stripe.com/docs/stripe.js');
    }
  };
  return Stripe;
}).call(this);
if (typeof module !== "undefined" && module !== null) {
  module.exports = this.Stripe;
}
if (typeof define === "function") {
  define('stripe', [ ], function( ) {
    return _this.Stripe;
  });
}
}).call(this);
(function( ) {
  var e, requestID, serialize,
    __slice = [ ].slice;
  e = encodeURIComponent;
  requestID = new Date( ).getTime( );
  serialize = function(object, result, scope) {
    var key, value;
    if (result == null) {
      result = [ ];
    }
    for (key in object) {
      value = object[key];
      if (scope) {
        key = "" + scope + "[" + key + "]";
      }
      if (typeof value === 'object') {
        serialize(value, result, key);
      } else {
        result.push("" + key + "=" + (e(value)));
      }
    }
    return result.join('&').replace('%20', '+');
  };
  this.Stripe.ajaxJSONP = function(options) {
    var abort, abortTimeout, callbackName, head, script, xhr;
    if (options == null) {
      options = { };
    }
    callbackName = 'sjsonp' + (++requestID);
    script = document.createElement('script');
    abortTimeout = null;
    abort = function( ) {
      var _ref;
      if ((_ref = script.parentNode) != null) {
        _ref.removeChild(script);
      }
      if (callbackName in window) {
        window[callbackName] = (function( ) { });
      }
      return typeof options.complete === "function" ?
options.complete('abort', xhr, options) : void 0;
    };
    xhr = {
      abort: abort
    };
```

```
script.onerror = function( ) {
  xhr.abort( );
  return typeof options.error === "function" ?
    options.error(xhr, options) : void 0;
};
window[callbackName] = function( ) {
  var args;
  args = 1 <= arguments.length ? ___slice.call(arguments, 0) : [ ];
  clearTimeout(abortTimeout);
  script.parentNode.removeChild(script);
  try {
    delete window[callbackName];
  } catch (e) {
    window[callbackName] = void 0;
  }
  if (typeof options.success === "function") {
    options.success.apply(options, args);
  }
  return typeof options.complete === "function" ?
options.complete('success', xhr, options) : void 0;
};
options.data || (options.data = { });
options.data.callback = callbackName;
if (options.method) {
  options.data._method = options.method;
}
script.src = options.url + '?' + serialize(options.data);
head = document.getElementsByTagName('head')[0];
head.appendChild(script);
if (options.timeout > 0) {
  abortTimeout = setTimeout(function( ) {
    xhr.abort( );
    return typeof options.complete === "function" ?
options.complete('timeout', xhr, options) : void 0;
  }, options.timeout);
}
return xhr;
};
}).call(this);
(function( ) {
  this.Stripe.trim = function(str) {
    return (str + '').replace(/^\s+|\s+$/g, '');
  };
  this.Stripe.underscore = function(str) {
    return (str + '').replace(/([A-Z])/g, function($1) {
      return "_" + ($1.toLowerCase( ));
    });
  };
```

```
  this.Stripe.luhnCheck = function(num) {
    var digit, digits, odd, sum, _i, _len;
    odd = true;
    sum = 0;
    digits = (num + '').split('').reverse( );
    for (_i = 0, _len = digits.length; _i < _len; _i++) {
      digit = digits[_i];
      digit = parseInt(digit, 10);
      if ((odd = !odd)) {
        digit *= 2;
      }
      if (digit > 9) {
        digit -= 9;
      }
      sum += digit;
    }
    return sum % 10 === 0;
  };
  this.Stripe.cardTypes = (function( ) {
    var num, types, _i, _j;
    types = { };
    for (num = _i = 40; _i <= 49; num = ++_i) {
      types[num] = 'Visa';
    }
    for (num = _j = 50; _j <= 59; num = ++_j) {
      types[num] = 'MasterCard';
    }
    types[34] = types[37] = 'American Express';
    types[60] = types[62] = types[64] = types[65] = 'Discover';
    types[35] = 'JCB';
    types[30] = types[36] = types[38] = types[39] = 'Diners Club';
    return types;
  })( );
}).call(this);
"""
```

FIG. 3. #4:

The createToken request is sent to the Stripe Cardholder System, also called apiori. This system is especially designed to handle Payment Information (220) and remove the need for other parts of the system to be subject to subject to the more stringent security/compliance requirements.

A frontend ngnix server (305) in apiori receives the Stripe.createToken request. The ngnix server (305) reverse proxies the request to an apache instance (310) running an application firewall. The apache instance (310) reverse proxies the request to the apiori-sry application (315) (hitting the "frontend server" code).

The apiori-sry application (315) first parses both the GET and POST parameters, ensuring that no key is passed twice.

```
" " "
module Rack
  module Utils
    # Modified from parse_query in rack:lib/rack/utils.rb
    def self.parse_query_unique_keys(qs, d = nil)
      params = { +56
      # By doing the select here, we allow multiple empty params, which apiori-sry can generate.
      kvpairs = (qs || '').split(d ? /[#{d}] */n : DEFAULT_SEP).select {|p| p.length > 0 }.map do |p|
        p.split('=', 2).map { =x= safe_unescape(x) } # [k, v]
      end
      multiple = kvpairs.group_by {=kv= kv[0] }.select {=key, kvs= kvs.length > 1 {
      if multiple.length > 0
        # TODO: escape </script>
        key, kvs = multiple.first
        raise Apiori::InvalidRequest.new("Parameter #{key} passed multiple times (values
```

```
provided were #{kvs.map { |=kv= kv[1] }.join(', ')})", 400)
    end
    kvpairs.each do |kv|
        params[kv[0]]= kv[1]
    end
    return params
end
"""
We delete the 'card[luhn_valid]' parameter if it's present:
"""
    # Don't let this be forged.
    post_data.delete 'card[luhn_valid]'
    get_data.delete 'card[luhn_valid]40
"""
```

The apiori-sry application (315) then detects if the request contains sensitive Payment Information (120), specifically the Primary Account Number (PAN). The application detects the PAN by inspecting the POST, and if not present there, the GET parameters, and verifying that the number looks like a valid PAN:

Detection of PAN by apiori-sry application

```
"""
    post_ccno = post_data['card[number]']
    get_ccno = get_data['card[number]']
    if ccno = post_ccno or ccno = get_ccno
    # Canonicalize ccno
    ccno = ccno.gsub(/[-]/,'')
    # Make sure it looks like a credit card number
    unless ccno =~ /^\D+$/
        respond_with_invalid_card(ccno)
        return
    end
    # And is long enough to even make a legitimate token (as first 6 + last 4 are
part of token)
    if ccno.length > 10
"""
```

If detected, the apiori-sry application (315) redacts the PAN and CVC and logs the redacted request to disk.

The apiori-sry application (315) then uses an SSL client certificate to make a request over HTTPS to the crypto-sry ngnix instance (320), which forwards the request to the crypto-sry application (325) requesting an encryption of the PAN. The crypto-sry application (325) encrypts the PAN using AES-256.

Encryption/Decryption of PAN

The apiori-srv application formats a POST request containing op and data parameters:
```
"""
    if (op = post_data['op']) && (data = post_data['data']) && (%w
{encrypt
decrypt}.include?(op))
        result = Crypto.send(op.to_sym, data)
    end
"""
The actual crypto is done via:
"""
    module Crypto
        def self.aes(m,k,t)
            (aes = OpenSSL::Cipher::Cipher.new('aes-256-cbc').send(m)).key =
```

Encryption/Decryption of PAN

```
            Digest::SHA256.digest(k)
            aes.update(t) << aes.final
        end
        def self.encrypt(text)
            aes(:encrypt, key, text)
        end
        def self.decrypt(text)
            aes(:decrypt, key, text)
        end
"""
```

The crypto-sry application (325) then makes a request to the cards database (355) looking for whether the encrypted PAN is already present and mapped to a Magic Card Number. If it exists, it retrieves the relevant Magic Card Number. If not, it creates a new Magic Card Number, inserts it into the cards database (355), and uses the new Magic Card Number instead.

Generation of Magic Card Number

The length of the token is chosen such that in a billion-row table, the chance of collision is one in a million. Magic Card Numbers are of the form (first 6)(randomness of >= 13 chars)(last 4):
```
"""
mysql = self
    bin = ccno[0..5]
    last4 = ccno[-4..-1]
    # Solve[1 - Exp[-n^2/(2 60^chars)] == 10^-6 /. n ->
10^9, chars] = 13.29
    magic_token = String.random(13)
    magic = "#{bin}#{magic_token}#{last4}"
"""
```

The apiori-sry application (315) then substitutes the Magic Card Number into the POST request and uses an SSL client certificate to make a request over HTTPS to the Stripe API infrastructure (bapi).

FIG. 3. #5:

The POST request initially hits the bapi-nginx instance (330) in the Stripe API (bapi) infrastructure. The bapi-nginx (330) forwards the request to haproxy (335) (used for load balancing), which forwards the request to a bapi-sry application (340). The bapi-sry application (340) authenticates the request using the Publishable Key (see Appendix I: Keys and Authentication) and then redacts the CVC and logs the request. CVC codes cannot be stored, so they are replaced with '*' prior to logging. The bapi-sry application (340) makes an entry for the request in the charge collection (375).

If the request requires interaction with the Card Network (500) (for example, if it requires a card validation or an authorization for a purchase amount), the bapi-sry application (340) formats a POST request containing the ISO8583 message to be forwarded to the Processor (400). The actual Magic Card Number and CVC are sent as separate post parameters. The actual Processor gateway information is retrieved using the Merchant collection (385) and Merchant Gateway collection (390).

The bapi-sry application (400) formats the PAN in the ISO8583 message to:

(first six digits in Magic Card Number)
000000
(last four digits in Magic Card Number)
and the CVC to:
(000)

This is done so the full ISO8583 message can be logged without redaction. Also, by inserting (000000), it eliminates the need to modify the parser to handle special characters in Magic Card Numbers.

Formatted ISO8583 Authorization Request/Response Message
(with redacted PAN and CVC)

```
" " "
[v2.stripe.com/pfN6oM-FS-248673]    Sending authorization request (conv
fdc_QndFt5LMhFnz5B): MTI:100 (Authorization Request)
002                 Primary Account Number: "3723990000004004"
003                 Processing Code: "000000"
004                 Amount of Transaction: 100
007                 Transmission Date/Time : Tue Oct 25 01:17:22 UTC 2011
011                 System Trace/Debit Reg E Receipt Number: 451665
012                 Time, Local Transmission: Mon Oct 24 18:17:22 UTC 2011
013  Date, Local Trans. (Debit/EBT)/Sales Date (Credit) : Mon Oct 24 18:17:22 UTC 2011
014                 Card Expiration Date: "1411"
018                 Merchant Category Code: "5734"
022                 POS Entry Mode+ Pin Capability: "010"
024                 Network International ID (NII) : "001"
025                 Point of Service (POS) Condition Code: "59"
037                 Retrieval Reference Number: "jzNyVV90jdID"
041                 Terminal ID: "00000001"
042                 Merchant: "445120690992"
049                 Transaction Currency Code: 840
059                 Merchant Zip/Postal Code: "90291"
063  Tables (First Data Private Use Data Element) : }:additional_pos_info=>{:type=>"07"},
:additional_amex_data=>{:seller_id=>"1048025720", :indicator=>"X"},
:card code value information=>{:presence=>"1", :cvc=>"0000"}+56
[v2.stripe.com/pfN6oM-FS-248673]    Response: MTI:110 (Authorization
Request Response)
003                 Processing Code : 0
004                 Amount of Transaction: 100
007   Transmission Date/Time : 2011-10-25T01:17:22+00:00
011    System Trace/Debit Reg E Receipt Number: 451665
024       Network International ID (NII) : 1
025      Point of Service (POS) Condition Code : 59
037      Retrieval Reference Number: "jzNyVV90jdID"
038      Authorization Identification Response: "265896"
039      Response Code: "00" [Approved (for capture)]
041                 Terminal ID: "00000001"
063      Tables (First Data Private Use Data Element) :
{:host_response_text=>{:response_data=>"APPROVAL    "},
:additional_amex data=>{:tran_id=>"000281046559270", :filler2=>"000000000000",
:indicator=>" ", :pos_data=>"6600S0S00001"}.
:card_code_value_information=>{:presence=>"M"}}
[v2.stripe.com/pfN6oM-FS-248673]    Results summary: APPROVAL (success)
{"rcode"=>"00"} {:avs_result=>{:code=>nil}, :authorization=>"265896", :test=>nil,
:cvv_result=>"M"}
" " "
```

The bapi-sry application (340) then uses an SSL client certificate to request over SSL the apiori gateway-nginx instance (345).

FIG. 3. #6:

The gateway-nginx instance (345) forwards the request received from bapi-sry application (340) back to the apiori-sry application (315) (hitting the "gateway server" code) to make the actual request to the Processor (400). The apiori-sry application (315) redacts the CVC and logs the request.

The apiori-sry application (315) uses the Magic Card Number to retrieve the encrypted PAN from the card database (355). It then makes a request to the crypto-sry ngnix instance (320) requesting decryption of the encrypted PAN. The crypto-sry ngnix instance (320) forwards this to the crypto-sry application (325), which decrypts the card number and returns it to the apiori-sry application (315).

The apiori-sry application (315) places the correct PAN and CVC into the ISO8583 message and sends it to the Processor (400).

FIG. 3. #7:

Upon receiving the response from the Processor, the apiori-sry application (215) removes the card number from the ISO8583 response, replacing it with the Magic Card Number and logs the result (no CVC is present in the response).

FIG. 3. #8:

The apiori-sry application (315) returns the result in a JSON result to bapi-sry application (340).

Sample Authorization Response from apiori-srv to bapi-srv application
With no special characters (using Ruby's .inspect method):

"{\n \"global_id\": \"v2.stripe.com/pfN6oM-GS-248674\",\n \"data\": \"\\u0001\\u00102

\\u0001\200\\u000e\200\\u0000\\u0002\\u0000\\u0000\\u0000\\u0000\\u0000\\u0000\\u0000\\u0

001\\u0000\\u0010%\\u0001\\u0017\\\"E\\u0016e\\u0000\\u0001YjzNyVV90jdID265896000000

0001\\u0000u\\u0000H14 000281046559270

6600S0S00001000000000000\\u0000\\u001822APPROVAL       \\u0000\\u000349M\",\n

\"fd_server\":\"167.16.0.152:30537\"\n}"

FIG. 3. #9:

If the authorization was successful, the bapi-sry application (340) will then generate a Single-use Token (350), which is stored in the singleusecard collection (360). The token has a 'card' attribute, so that one will know which Magic Card Number the token corresponds to for later use. The 'token' attribute is the handle that is returned to the end-user.

| Generation of Single Use Token |
| --- |

```
"""
module Opus
  module DB
    module Model
      class SingleUseCard < AbstractModel
        collection 'singleusecard'
        index :card
        _prop :token, String, :name => '_id'
        _prop :card, String
        _prop :created, Numeric
        _prop :used, Boolean
        _prop :merchant, String
        _prop :livemode, Boolean
        _opt :autogenerated, Boolean # used to indicate we generated
for display in something like the docs
        _opt :authz_charge, String
        def self.generate(merchant, card, livemode, authz)
          c = SingleUseCard.new
          c.merchant = merchant
          c.created = Time.stamp
          c.used = false
          c.card = card.token
          c.authz_charge = authz.token if authz
          c.livemode = livemode
          c.token = String.randkey('tok')
          c
        end
      end
    end
  end
end
```

| -continued |
| --- |
| Generation of Single Use Token |

```
end
"""
```

The bapi-sry application (340) logs the result and then generates a response to the API request, logs it, and then returns it to the browser with the Single-use Token (350) included.

Here is an example request-response for Single-use Token creation:

As further described below, the payment processor (Stripe (300)) also stores a set of valid secret keys, and there is a secret key associated with the merchant site. The server-side application sends the Token (350) and the secret key to the payment processor to conduct the transaction. The payment processor prevents authorization of the transaction if the

---

Sample API request/response
"""
:~$ curl https://api.stripe.com/v1/tokens -u "$STRIPE_API_KEY:"-0 -d
card[number]=4242424242424242 -d card[exp_month]=03 -d card[exp_year]=2015 -d
amount=200
{
    "amount": 200,
    "created": 1319505583,
    "currency": "usd",
    "id": "tok_WQcVvsEfPKyiB9",
    "livemode": false,
    "object": "token",
    "used": false,
    "card": {
    "country": "US",
    "exp_month": 3,
    "exp_year": 2015,
    "last4": "4242",
    "object": "card",
    "type": "Visa"
}
}
"""

---

FIG. 3. #10:

Once sent to the Customer's Browser (210), the response handler adds the Single-use Token (350) to the Payment Form (110) and submits it, without Payment information (220), to the Merchant's Servers (120). The data will be sent as an HTTP POST to the URL in the form's action.

As discussed above, in the embodiment wherein Stripe (300) performs its own verification, no communication will occur between the Stripe API Server (bapi) (304) and the Processor (400) to perform the verification, as shown in steps (6) and (7) of FIG. 3.

Using the process described above, the payment processor (Stripe (300)) enforces a rule that prevents a previously used token from being used for another transaction.

To further summarize the process described above, the payment processor (Stripe (300)) stores a set of valid publishable (non-secret) keys, and there is a non-secret key associated with the merchant site. The non-secret key is sent by the client-side application to the payment processor with the payment information. The payment processor compares the non-secret key received from the client-side application to the set of valid non-secret keys, and creates the Token (350) only if the non-secret key received from the client-side application is a valid non-secret key. Furthermore, in the preferred embodiment of the present invention, the non-secret key is restricted by the payment processor to only being used for creating the token.

secret key is not a valid secret key, or if the secret key is not associated with the merchant site that is associated with the Token (350).

IV. Using a Single-Use Token

A Single-use Token (350) can be used in place of a credit card dictionary with any API method (see Appendix V). The Merchant (100) can use a number of client libraries to interact with the API (see Appendix IV).

A Single-use Token (350) can be used once to: charge the corresponding customer's credit card or attach it to a customer object that will let them charge the customer's credit card at any point in the future.

A. Using a Single-Use Token to Charge a Card

This section explains the detailed flows and entities that use a Single-use Token (350) to request a charge that results in funds being paid to the Merchant (200) and charged to the Customer (100).

Figure 4:
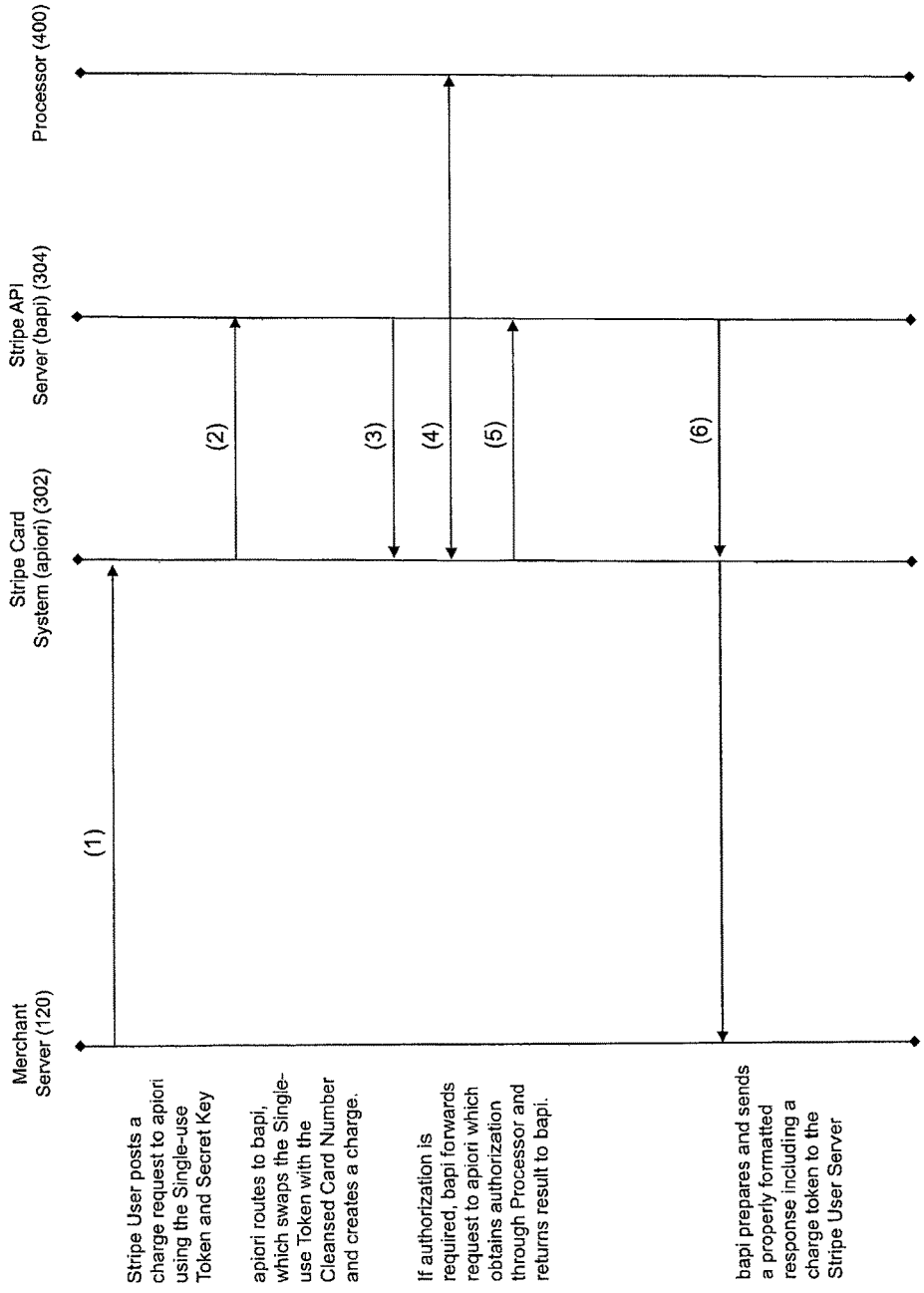

(Refer to FIG. 4).

FIG. 4. #1:

The Merchant (100) via its Merchant Server (120) submits a charge to Stripe Card System (apriori) (302) of Stripe (300) using the Single-use Token (350) in the POST parameters submitted by the Payment Form (110) and their Secret Key (see Appendix I: Keys and Authentication).

The Merchant Server (120) of Merchant (100) submits one simple call, which is sent to Stripe Card System (apriori) (302) of Stripe (300).

```
Ruby Example
# get the credit card details submitted by the form
token =params[:stripeToken]
# set your secret key: remember to change this to your live secret key in production
# see your keys here https://manage.stripe.com/account
Stripe.api_key = "secret key"
# create the charge on Stripe's servers - this will charge the user's card
charge = Stripe::Charge.create(
    :amount => 1000, # amount in cents, again
    :currency => "usd",
    :card => token,
    :description => "payinguser@example.com"
)
```

FIG. 4. #2:

When received, Stripe Card System (apiori) (302) forwards the request to the bapi-sry application (340) in the Stripe API Server (bapi) (304) which first authenticates the Merchant (100) using the Secret Key.

Given a Single-use Token (350), the bapi-sry application (340) looks up the corresponding value in the singleusecard collection (360) and pulls up the corresponding card object. The cached CVC is also loaded from memory, if available:

```
"""
def get_card_obj(card)
    if card.is_a?(Hash)
        [...]
    elsif card.is_a?(String)
        sc = SingleUseCard.load(card)
        if !sc
            Opus::Event::Model::SingleUseTokenUsage.report(:message => "Attempt to use non-existent token",
                :type =>
Opus::Event::Model::SingleUseTokenUsage::Type.invalid,
                :single_use_token => card)
            raise UserError.new("Invalid token id: #{card}")
        elsif sc.used
            ch = Charge.load(sc.authz_charge)
            Opus::Event::Model::SingleUseTokenUsage.report_usage("Attempt to use already used single use token", Opus::Event::Model::SingleUseTokenUsage::Type.reused, sc, ch, nil)
            raise UserError.new("You cannot use a stripe token more than once: #{card}")
        elsif sc.merchant != @merchant.token
            other_name = Opus::Event::Util.merchant_name(sc.merchant)
            Opus::Event::Model::SingleUseTokenUsage.report(:message => "Attempt to use another merchant's (#{other_name}) token!",
                :type =>
Opus::Event::Model::SingleUseTokenUsage::Type.merchants_mixed,
                :single_use_token => card)
            raise UserError.new("Invalid token id: #{card}")
        end
        c = Card.load(sc.card)
        if cvc = CVC.load_from_memory(:card => c.token)
            c.cvc = cvc.number
        end
        assert(c.merchant == @merchant.token, "Merchant making this call is not the merchant that owns this card", true)
        c
    else
        raise "Card is not a string or a hash"
    end
end
"""
```

The bapi-sry application (340) then creates a charge on the card object the same way that it would create a charge when provided with Payment Information (220) instead of a Single-use Token (350). The object is added to the charge collection (375).

```
def local_work
    register_data(:charge_struct) do
        recurring = Boolean.parse(param?(:recurring))
        uncaptured = Boolean.parse(param?(:uncaptured))
        allocate_charge_struct(card,
                    nil, # customer
                    param!(:amount).to_i,
                    param!(:currency),
```

-continued

```
                    @key.livemode,
                    recurring,
                    param?(:mnemonic),
                    uncaptured,
                    param?(:statement_description),
                    @key.system,
                    @key.publishable)
        end
    end
    def remote_work
        execute_charge_struct(charge_struct)
    end
```

FIG. 4. #3:

The bapi-sry application (340) then determines if the charge requires the authorization from the customer's card issuing bank (600). Authorization is required if the Single-use Token (350) has expired or if the charge request is for a different amount than the one originally submitted with the createToken request.

FIG. 4. #4-5:

If authorization is required, the bapi-sry application (340) forwards the request to apiori, which communicates with the Processor (400) and/or Card Network (500) directly and responds with the results of the authorization as previously described.

FIG. 4. #6:

If authorized, the bapi-sry application (340) flags the charge for settlement and returns the appropriate response to the Merchant servers (120).

All charges flagged for settlement are submitted in batches to the Processor (400) and/or Card Network (500) directly. The Card Network (500) then causes the funds to be paid by the Card Issuing Bank (600) to Stripe (300) or to Stripe's Acquiring Bank (700). Stripe (300) then causes the settled funds to be sent to the Merchant (100) (or to the Merchant's Bank (800)), net of any applicable fees. The Card Issuing Bank (600) collects the paid funds from the Customer (200).

As discussed above, in the embodiment wherein Stripe (300) performs its own verification, no communication will occur between the Stripe API Server (bapi) (304) and the Processor (400) to perform the verification, as shown in step (4) of FIG. 4.

B. Attach a Single-Use Token to a Customer

Stripe provides a Customer abstraction that makes it easy to save information for later use. Instead of charging the card immediately, Merchant's (100) can use the Single-use Token (500) to create a new Customer object and save the card to that customer. This will let them charge the Customer (100) at any point in the future.

Figure 5:
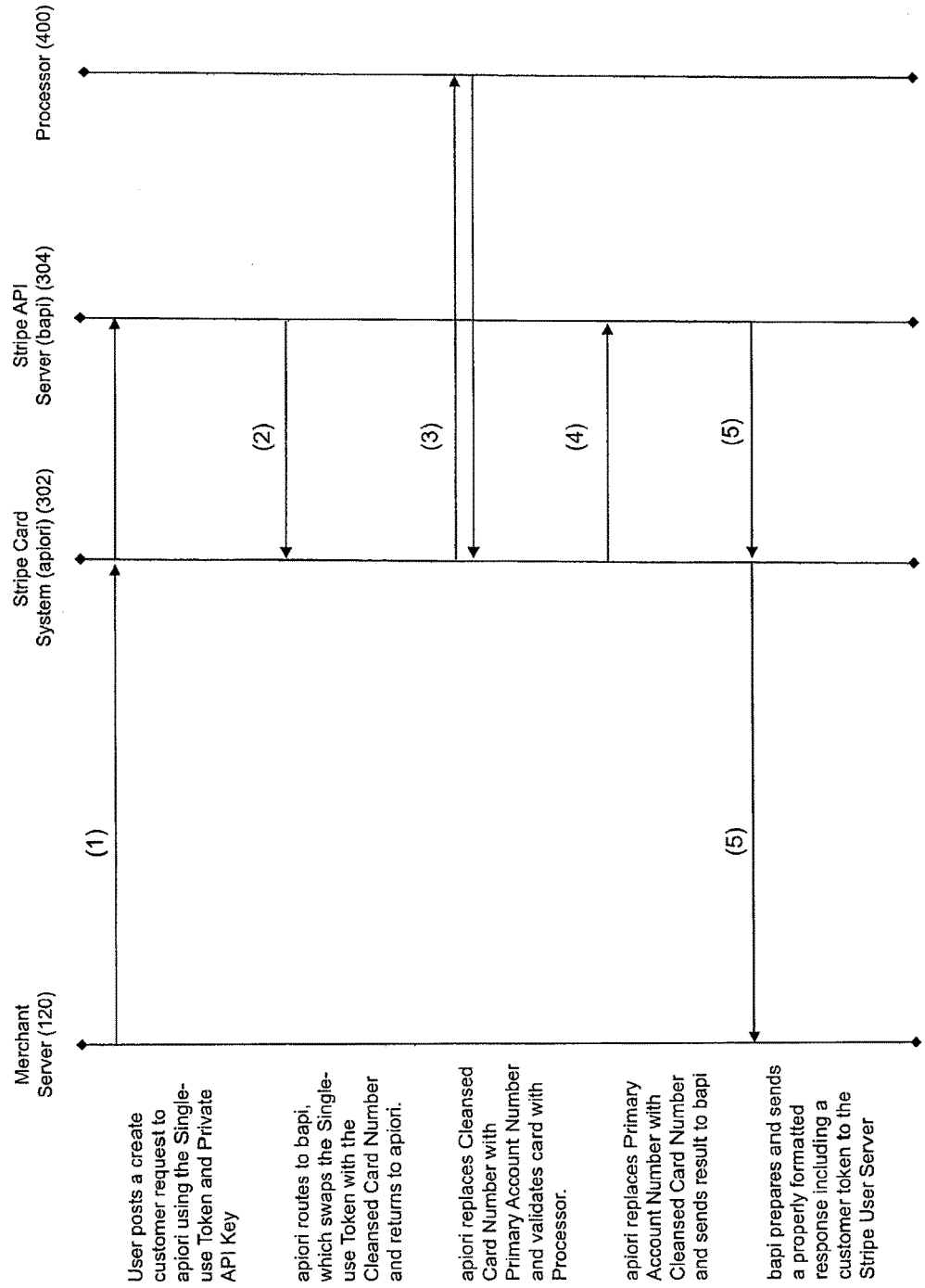

(Refer to FIG. 5).

```
Ruby Example
# get the credit card details submitted by the form
token = params[:stripeToken]
# set your secret key: remember to change this to your live secret key in production
# see your keys here https://manage.stripe.com/account
Stripe.api_key = "x4QskhVV9tee1kdDxOazKA6s0wsjFHHC"
# create a Customer
customer = Stripe::Customer.create(
    :card => token,
    :description => "payinguser@example.com"
)
```

FIG. 5. #1:

The request is sent to Stripe Card System (apriori) (302) of Stripe (300), which forwards the request to bapi-sry application (340) of Stripe API server (bapi) (304).

FIG. 5. #2:

Given a Single-use Token (350), the bapi-sry application (340) looks up the corresponding value in the singleusecard collection (360) and pulls up the corresponding card object. The cached CVC is also loaded from memory, if available:

```
def new_card(c)
    return nil unless c
    card = get_card_obj(c)
end
def common_local_work
    @cust = get_customer(@params[:id])
    set_parameters(@cust)
    @discount = generate_discount if param?(:coupon)
    @card = new_card(param?(:card)) if param?(:card)
end
```

The bapi-sry application (340) formats an authorization request to validate the card and forwards it to apiori.

FIG. 5. #3:

Apiori communicates with the Processor (400) or directly with the Card Network (500) to get an authorization. The authorizations are automatically reversed five minutes later.

```
def local_work
    [...]
    validate_card_if_necessary if !@charge_struct && @card
end
def validate_card_if_necessary
    # If this card has a single use token, stripe.js has already validated this card
    sc = SingleUseCard.load_one(:card => @card.token)
    if !sc || !sc.authz_charge || sc.used
        @validation_charge_struct = allocate_validation_charge_struct(@card,
            0,
            @key.livemode,
            false, # this isn't a single use card creation
            @cust.token, # is validating on a customer
            false, # not a fallback from a $0 auth
            @key.system,
            @key.publishable)
    end
end
```

FIG. 5. #4:

Apiori returns the validation results to the bapi-sry application, which attaches the card to the relevant Customer object in the Customer collection (380):

```
def save_db_objects
    # Very unlikely, but card might have changed since we made it
    @card = Card.load(@card.token) if @card
    if @charge
        if @charge.paid || !self.should_create
            CustomerCharge.create(@cust.token, @charge.token)
            InvoiceCharge.create(@invoice.token, @charge.token, InvoiceCharge.update_customer)
        end
        unless @charge.paid
            err = @charge.errors.first
            raise BadUserInputErron.new(err['message'], err['detail'].to_s, err['code'].to s)
        end
    end
    add_card_to_customer if @card
    if @invoice && @charge
        @invoice.paid = @charge.paid
        @invoice.charge = @charge.token
        @invoice.closed_at = Time.stamp if @invoice.paid
    end
    objects_to_save = [@charge, @sub, @invoice, @previous, @discount]
    objects_to_save += @prorations if @prorations
    objects_to_save.each{|obj| obj.save if obj}
    @cust.save
    [...]
end
def add_card_to_customer
    @cust.cards << @card.token
    @cust.active_card = @card.token
end
```

FIG. 5. #5:

Once created, the Merchant (100) receives a customer token, which can later be used to make calls against the Stripe API (see Appendix V).

```
# save the customer ID in your database so you can use it later
save_stripe_customer_id(user, customer.id)
# later
customer_id = get_stripe_customer_id(user)
Stripe::Charge.create(
    :amount => 1500, # $15.00 this time
    :currency => "usd",
    :customer => customer_id
)
```

As discussed above, in the embodiment wherein Stripe (300) performs its own verification, no communication will occur between the Stripe API Server (bapi) (304) and the Processor (400) to perform the verification, as shown in step (3) of FIG. 5.

V. Databases and Collections

The following section describes the databases and collections used for Stripe.js.

Cards Database (355) in Apiori

Table used to store credit cards. Primary Account Numbers (PAN) corresponding to a credit card are stored in encrypted format.

| Field | Type | Description |
| --- | --- | --- |
| ID | int(11) | Internal dentifier for each card/PAN |
| Number | blob | Encrypted Primary Account Number |
| Magic Number | varchar(50) | Magic number generated for PAN |
| Created | int(10) | Date/Time added to table |
| Request_ID | varchar(50) | Unique identifier for logged request |

Cards Collection (365) in Bapi

Collection used to store credit cards. Cards collection does not store any Primary Account Numbers.

| Property | Type | Description |
| --- | --- | --- |
| token | String | Internal identifier for each card/PAN (name => 'id') |
| number | String | Magic number generated for PAN |
| created | Numeric | Date/Time added to collection |
| name | String | Cardholder's full name |
| exp_year | Integer | Expiration year for card |
| exp_month | Integer | Expiration month for card |
| address_line1 | String | Cardholder's address line 1 |
| address_line2 | String | Cardholder's address line 2 |
| address_zip | String | Cardholder's zip code |
| address_state | String | Cardholder's state |
| address_country | String | Cardholder's country |
| luhn_valid | Boolean | Boolean on whether card passed luhn test |
| merchant | String | Identifier to merchant submitting card (in merchant collection) |
| merchantkey | String | Identifier to key used to submit card (in merchant key collection) |
| avs_code | String | Result of address verification check |

Single Use Card Collection (360) in Bapi

Collection used to store Single-use Tokens.

| Property | Type | Description |
| --- | --- | --- |
| token | String | Internal identifier for each token |
| card | String | Identifier to card in card collection |
| created | Numeric | Date/Time added to collection |
| used | Boolean | Has token been used |
| merchant | String | Identifier to merchant in merchant collection |
| livemode | Boolean | Was token generated for live or test mode |
| authz_charge | String | Identifier to authorization in charge collection |

Charge Collection (375) in Bapi

Collection used to store authorization requests generated for each card.

| Property | Type | Description |
| --- | --- | --- |
| token | String | Internal identifier for each authorization |
| created | Numeric | Date/Time added to collection |
| numeric_id | Integer | Identifier for each authorization request sent to processor |
| amount | Integer | Amount of authorization |
| currency | String | Currency of authorization |
| card | String | Identifier to card object (in card collection) |
| fee_amount | Integer | Charge to merchant for authorization |
| feeplan | String | Pricing Plan for charge |
| merchant | String | Identifier to the merchant requesting authorization (in merchant collection) |
| merchantkey | String | Identifier to key used by merchant to submit request (in merchant key collection) |
| mrchgateway | String | Identifier to gateway used for authorization (in merchant gateway collection) |
| mnemonic | String | For merchant: a description of charge to be associated with authorization |
| statement_description | String | Description to appear in cardholder statement |
| auth_avs_result | String | Result of address verification for authorization |
| is_card_validation | Boolean | Is authorization to validate a card |
| livemode | Boolean | Is authorization in live or test mode |
| gateway_conversations | Array | Log message for request/response with Processor |
| authorized | Boolean | Was authorization successful |
| captured | Boolean | Merchant requested capture of funds with authorization |
| refunded | Boolean | Has charge associated with authorization been refunded |
| recurring | Boolean | Was authorization for a recurring/subscription plan |
| auth_attempt_time | Numeric | Time authorization was attempted |
| auth_errors | Array | Used for logging of authorization errors |
| auth_gw_token | String | Authorization code received from processor gateway |
| settlement_state | String | Authorization state for capture of funds (Ready for settlement, Submitted for settlement, No (do not submit)) |

Customer Collection (380) in Bapi

Collection used to store customers created for each merchant.

| Property | Type | Description |
| --- | --- | --- |
| token | String | Internal identifier for each customer |
| merchant | String | Identifier to merchant submitting customer (in merchant collection) |
| created | Numeric | Date/Time added to collection |
| cards | Array | Identifiers to card objects for customer (in card collection) |
| active_card | String | Identifier to the active card for customer (in card collection) |
| mrchid | String | Used by merchant, internal customer identifier |
| mnemonic | String | EFor merchant, customer description |
| livemode | Boolean | Customer created in test or live mode |
| suspended | Boolean | Is customer suspended |
| deleted | Boolean | Is customer deleted |
| email | String | Customer email address |
| delinquent | Boolean | Is customer delinquent |
| assessment_period | Array | Used for customer subscription period |

Merchant Collection (385) in Bapi

Collection used to store merchant accounts created.

| Property | Type | Description |
| --- | --- | --- |
| token | String | Internal identifier for each merchant |
| name | String | Merchant name |
| email | String | Merchant email |
| password | String | Merchant password (hash) |
| created | String | Date/Time added to collection |
| settings | Hash | Account settings for merchant |
| last_login | Numeric | Last login date/time |

Merchant Key Collection (395) in Bapi

Collection used to store merchant API keys (publishable and secret).

| Property | Type | Description |
| --- | --- | --- |
| token | String | Internal identifier for each key |
| merchant | String | Internal identifier for merchant |
| livemode | Boolean | Is key for use in live or test mode |

-continued

| Property | Type | Description |
|---|---|---|
| created | Numeric | Date/Time added to collection |
| name | String | For merchant, name/descriptor for key |
| publishable | Boolean | Is it publishable or secret key |
| system | Boolean | Is key for internal system use |
| expires_at | Numeric | Key expiration |

Merchant Gateway Collection (390) in Bapi

Collection used to store merchant gateways available for authorization and settlement.

| Property | Type | Description |
|---|---|---|
| token | String | Internal identifier for each gateway |
| merchant | String | Identifier to merchant in merchant collection |
| gateway | Boolean | gateway to be used for merchant |
| created | Numeric | Date/Time added to collection |
| credentials | Hash | Used to access gateway |
| active | Boolean | Is gateway active |

Alternative Embodiments

The detailed description above provides an embodiment of the present invention in which the merchant's client-side application runs in a web browser. In this case, Stripe.js is used as a javascript helper through which to use Stripe's tokenization API. However, in an alternative embodiment, the client-side application does not run in a web browser. Instead, the merchant's client-side application runs in a native mobile application (for example, in an Android™ or iPhone® app). In this case, the transaction flow described above would still be the same, with the exception that the transaction would be initiated from within a native mobile application.

Referring again to FIG. 8, in an alternative embodiment, the client-side application may retrieve payment information from the customer's electronic device without the use of the Payment Form (110). Examples of such embodiments include the following:

1. Retrieve the payment information by taking an electronic image of a physical credit card using the customer's electronic device.

2. Speak the payment information into voice recognition software associated with the customer's electronic device.

3. Retrieve the payment information from an electronic wallet associated with the customer's electronic device.

As discussed above with respect to FIG. 1, Stripe (300) may perform its own authorization or validation of the payment information. The extent of authorization or validation is determined by Stripe (300). For example, Stripe (300) may perform only basic checks on the payment information to make sure that the correct fields and ranges are present before issuing a token, instead of actually verifying that the payment information is sufficient to allow a transaction to be completed (e.g., credit card is valid, credit limit has not been met). More extensive checks may also be performed by Stripe (300) without necessarily needing to communicate with the Processor (400), such as checking the payment information against a periodically updated invalid card file/account file, before issuing the token. Of course, if a payment is subsequently submitted by the merchant site (steps 6-10 of FIG. 1), the transaction will fail if the payment information is deficient.

As discussed above, the merchant site is associated with a client-side application and a server-side application. In one preferred embodiment, the merchant, merchant site, and merchant server are all the same business entity. In another embodiment, the merchant site may rely on a distributed network of business entities to perform the e-commerce transaction. For example, the merchant site and/or merchant server of the merchant may be hosted by a third party entity.

Appendix I: Authentication and API Keys

Merchants authenticate to the Stripe API by providing one of their API keys in the request. Authentication to the API occurs via HTTP Basic Auth. The merchant API key is used as the basic auth username. No password needs to be provided.

Authentication is done via HTTP Basic Authentication by the bapi-sry application:

```
"""
    def prepare_params_from_v1_new_style_request(request)
        auth = Rack::Auth::Basic::Request.new(request.env)
        raise InvalidAPICredentialsError.bad_api_key(request.path) unless auth.provided?
            &&
auth.basic? && auth.credentials
        raise InvalidAPICredentialsError.bad_api_key(request.path, auth.credentials[0])
            unless
MerchantKey.load_usable(auth.credentials[0])
        # using { } instead of nil because downstream code adds keys
        params = !parse_error?(request) ? request.params.dup : { +56
        params['method'] = 'unknown_method'
        params['key'] = auth.credentials[0]
        params
    end
    def authenticate(request, params)
        key = MerchantKey.load_usable(params['key'])
        raise InvalidAPICredentialsError.bad_api_key(request.path, params ['key']) unless
            key
        mrch = Merchant.load(key.merchant)
        [key, mrch]
    end
"""
```

All API requests must be made over HTTPS. Calls made over plain HTTP will fail. Merchants must authenticate for all requests.

API Keys

Each Stripe Merchant account has two types of keys: secret and publishable keys. Both publishable and secret keys are generated upon account creation. Stripe (300) maintains a set of valid (active) secret keys and publishable keys.

Publishable API keys are meant solely to identify the Merchant's account with Stripe; they are not secret. In other words, they can safely be published in places like the Stripe.js javascript code, or in an Android™ or iPhone® app. Publishable keys only have the power to create Single-use Tokens (350).

Secret API keys should never be published, and must be kept confidentially on the Merchant's Servers (120). These keys can perform any API request (see Appendix V) to Stripe (300) without restriction.

In the Merchant model:

```
"""
    def generate_keys
        generate_key(true)
        generate_key(false)
        generate_key(true, :publishable)
        generate_key(false, :publishable)
    end
```

```
    def generate_key(livemode, type = :regular)
        k = MerchantKey.generate_for(self, type)
        k.livemode = livemode.to_bool
        k.save
        k
    end
"""
```

And in MerchantKey:

```
"""
    def self.generate_for(merchant, special_type = :regular)
        k = MerchantKey.new
        k.merchant = merchant.token
        k.publishable = false
        k.system = false
        k.created = Time.stamp
        case special_type
        when :regular
            k.token = String.random(32)
        when :publishable
            k.token = String.randkey('pk', 29)
            k.publishable = true
        when :system
            k.token = String.randkey('sys', 28)
            k.system = true
        else
            raise "Tried to generate unknown type of merchant key"
        end
        k
    end
"""
```

Appendix II: Sample Payment Form Using Stripe.js

```
<!DOCTYPE html>
<html lang="en">
    <head>
        <meta http-equiv="Content-type" content="text/html; charset=utf-8" />
        <title>Stripe Getting Started Form</title>
        <script type="text/javascript" src="https://js.stripe.com/v1/"></script>
        <!-- jQuery is used only for this example; it isn't required to use Stripe -->
        <script type="text/javascript"
src="https://ajax.googleapis.com/ajax/libs/jquery/1.6.2/jquery.min.js"></script>
        <script type="text/javascript">
            // this identifies your website in the createToken call below
            Stripe.setPublishableKey('YOUR_PUBLISHABLE_KEY');
            function stripeResponseHandler(status, response) {
                if (response.error) {
                    // re-enable the submit button
                    $('.submit-button').removeAttr("disabled");
                    // show the errors on the form
                    $(".payment-errors").html(response.error.message);
                } else {
                    var form$ = $("#payment-form");
                    // token contains id, last4, and card type
                    var token = response['id'];
                    // insert the token into the form so it gets submitted to the server
                    form$.append("<input type='hidden' name='stripeToken' value='" + token + "' />");
                    // and submit
                    form$.get(0).submit( );
                }
            }
            $(document).ready(function( ) {
                $("#payment-form").submit(function(event) {
                    // disable the submit button to prevent repeated clicks
                    $('.submit-button').attr("disabled", "disabled");
                    var chargeAmount = 1000; //amount you want to charge, in cents. 1000 = $10.00,
2000 = $20.00 ...
                    // createToken returns immediately - the supplied callback submits the form if there
are no errors
```

-continued

```
            Stripe.createToken({
                number: $('.card-number').val( ),
                cvc: $('.card-cvc').val( ),
                exp_month: $('.card-expiry-month').val( ),
                exp_year: $('.card-expiry-year').val( )
            }, chargeAmount, stripeResponseHandler);
            return false; // submit from callback
        });
    });
    </script>
</head>
<body>
    <h1>Charge $10 with Stripe</h1>
    <!-- to display errors returned by createToken -->
    <span class="payment-errors"></span>
    <form action="" method="POST" id="payment-form">
        <div class="form-row">
            <label>Card Number</label>
            <input type="text" size="20" autocomplete="off" class="card-number" />
        </div>
        <div class="form-row">
            <label>CVC</label>
            <input type="text" size="4" autocomplete="off" class="card-cvc" />
        </div>
        <div class="form-row">
            <label>Expiration (MM/YYYY)</label>
            <input type="text" size="2" class="card-expiry-month"/>
            <span> / </span>
            <input type="text" size="4" class="card-expiry-year"/>
        </div>
        <button type="submit" class="submit-button">Submit Payment</button>
    </form>
</body>
</html>
```

Appendix III: Client-Side Validation Helpers with Stripe.js validateCardNumber
Checks that the number is formatted correctly and passes the Luhn check.

```
// These will all return true, indicating a potentially valid card
// number. (Letters, spaces, and other punctuation are ignored.)
Stripe.validateCardNumber('4242424242424242')
Stripe.validateCardNumber('4242-42424242-4242')
Stripe.validateCardNumber('4242 4242 4242 4242')
// These invalid card numbers will all return false
Stripe.validateCardNumber('4242-1111-1111-1111')
// (Doesn't pass the Luhn check.)
Stripe.validateCardNumber('12345678')
Stripe.validateCardNumber('mistake')
``` validateExpiry
Checks whether or not the expiration date represents an actual month in the future.

```
Stripe.validateExpiry('02', '15') // true
Stripe.validateExpiry('02', '10') // false
Stripe.validateExpiry(2, 2020)    // true
``` validateCVC
Checks whether or not the supplied number could be a valid verification code.

```
Stripe.validateCVC('123') // true
Stripe.validateCVC(' ')   // false
``` cardType

Returns the type of the card as a string, e.g. "Visa", "MasterCard", "American Express" etc. If a card isn't recognized, it will return "Unknown".

```
Stripe.cardType('4242-4242-4242-4242') // "Visa"
Stripe.cardType('378282246310005')     // "American Express"
Stripe.cardType('1234')                // "Unknown"
```

Appendix IV

Examples of client libraries that may be used to interact with the API are listed below.
  i. Python
  ii. Ruby
  iii. PHP
  iv. Java
  v. Scala
  vi. A number of Third Party Libraries Appendix V: Stripe API Documentation The Stripe API is organized around Representational state transfer (REST). The Stripe API is designed to have predictable, resource-oriented URLS, to use HTTP response codes to indicate API errors, and to use built-in HTTP features, like HTTP authentication and HTTP verbs, which can be understood by off-the-shelf HTTP clients. JavaScript Object Notation (JSON) will be returned in all responses from the API, including errors.

To make it easy to test and explore the Stripe API, accounts have test-mode API keys as well as live-mode API keys. These keys can be active at the same time. Data created with test-mode credentials will never hit the credit card networks and will never cost anyone money.

A. Libraries

Libraries are available in several languages (see Appendix IV).

B. API Endpoint https://api.stripe.com/C.

C. Summary of Resource URL Patterns

/v1/charges
/v1/charges/{CHARGE_ID}
/v1/customers
/v1/customers/{CUSTOMER_ID}
/v1/customers/{CUSTOMER_ID}/subscription
/v1/invoices
/v1/invoices/{INVOICE_ID}
/v1/invoiceitems
/v1/invoiceitems/{INVOICEITEM_ID}
/v1/tokens
/v1/tokens/{TOKEN_ID}

D. Authentication

You authenticate to the Stripe API by providing one of your API keys in the request. You can manage your API keys from your account. You can have multiple API keys active at one time. Your API keys carry many privileges, so be sure to keep them secret!

Authentication to the API occurs via HTTP Basic Auth. Provide your API key as the basic auth username. You do not need to provide a password.

All API requests must be made over HTTPS. Calls made over plain HTTP will fail. You must authenticate for all requests.

E. Errors

Stripe uses conventional HTTP response codes to indicate success or failure of an API request. In general, codes in the 2xx range indicate success, codes in the 4xx range indicate an error that resulted from the provided information (e.g. a required parameter was missing, a charge failed, etc.), and codes in the 5xx range indicate an error with Stripe's servers.

Not all errors map cleanly onto HTTP response codes, however. When a request is valid but does not complete successfully (e.g. a card is declined), we return a 402 error code.

All errors return JSON with a type (one of card_error, invalid_request_error, or api_error) and message describing the particular problem.

Attributes i. Type: The type of error returned (card_error, invalid_request_error, api_error) Card errors are the most common type of error you should expect to handle. They result when the user enters a card that can't be charged for some reason. Invalid request errors arise when your request has invalid parameters. API errors cover any other type of problem (e.g. a temporary problem with Stripe's servers) and should turn up only very infrequently.

ii. Message: A user-friendly message describing the error.

iii. Code (optional): For card errors, additional information about the user-friendly message to display for this error (e.g. "Your card was declined.")

iv. Param (optional): The parameter the error relates to if the error is parameter-specific. You can use this to display a message near the correct form field, for example.

HTTP Status Code Summary

200 OK—Everything worked as expected.
400 Bad Request—Often missing a required parameter.
401 Unauthorized—No valid API key provided.
402 Request Failed—Parameters were valid but request failed.
404 Not Found—The requested item doesn't exist.
500, 502, 503, 504 Server errors—something went wrong on Stripe's end.

Errors

Invalid Request Errors
  Type: invalid_request_error
API Errors
  Type: api_error
Card Errors
  Type: card_error

| Code | Details |
| --- | --- |
| invalid_number | The card number is invalid |
| incorrect_number | The card number is incorrect |
| invalid_expiry_month | The card's expiration month is invalid |
| invalid_expiry_year | The card's expiration year is invalid |
| invalid_cvc | The card's security code is invalid |
| expired_card | The card has expired |
| invalid_amount | An invalid amount was entered |
| incorrect_cvc | The card's security code is incorrect |
| card_declined | The card was declined. |
| missing | There is no card on a customer that is being charged. |
| duplicate_transaction | A transaction with identical amount and credit card information was submitted very recently. |
| processing_error | An error occurred while processing the card. |

F. Charges

To charge a credit or a debit card, you create a new charge object. You can retrieve and refund individual charges as well as list all charges. Charges are identified by a unique random id.

Creating a New Charge (Charging a Credit Card)

To charge a credit card, you create a new charge object. If your API key is in test mode, the supplied card won't actually be charged, though everything else will occur as if in live mode. (Stripe assumes that the charge would have completed successfully.)

Arguments i. Amount (required): A positive integer in cents representing how much to charge the card. The minimum amount is 50 cents.

ii. Currency (required): 3-letter ISO code for currency. Currently, only 'usd' is supported.

iii. Customer (optional, either customer or card is required, but not both): The id of an existing customer that will be charged in this request.

iv. Card (optional, either card or customer is required, but not both): A card to be charged. The card can either be a token, like the ones returned by stripe.js, or a dictionary containing a user's credit card details, with the options described below. Although not all information is required, the extra info helps prevent fraud.

a. Number (required): The card number, as a string without any separators.
  b. exp_month (required): Two digit number representing the card's expiration month.
  c. exp_year (required): Four digit number representing the card's expiration year.
  d. Cvc (optional, recommended): Card security code
  e. Name (optional): Cardholder's full name.
  f. address_line1 (optional)
  h. address_line2 (optional)
  i. address_zip(optional)

j. address_state(optional)

k. address_country(optional)

v. Description (optional, default is null): An arbitrary string which you can attach to a charge object. It is displayed when in the web interface alongside the charge. It's often a good idea to use an email address as a description for tracking later.

Returns

Returns a charge object if the charge succeeded. An error will be returned if something goes wrong. A common source of error is an invalid or expired card, or a valid card with insufficient available balance.

If the cvc parameter is provided, Stripe will attempt to check the CVC's correctness, and the check's result will be returned. Similarly, if address_line1 or address_zip are provided, Stripe will similarly try to check the validity of those parameters. Some banks do not support checking one or more of these parameters, in which case Stripe will return an 'unchecked' result. And depending on the bank, charges can succeed even when passed incorrect CVC and address information.

Retrieving a Charge

Retrieves the details of a charge that has previously been created. Supply the unique charge id that was returned from your previous request, and Stripe will return the corresponding charge information. The same information is returned when creating or refunding the charge.

Because the charge has its own unique URL in our API, you can actually see the response directly in the browser by typing in the appropriate URL, or by clicking a link like the one below.

https://vtUQeOtUnYr7PGCLQ96U14zqpDUO4sOE@api.stripe.com/v1/charges/ch_qcndYXTK1 3AsZj Arguments Id (required): The identifier of the charge to be retrieved.

Returns

Returns a charge object if a valid identifier was provided, and returns an error otherwise.

Refunding a Charge

Refunds a charge that has previously been created but not yet refunded. Funds will be refunded to the credit or debit card that was originally charged. The fees you were originally charged will not be refunded, however. (That is, the customer will not have a net loss, but the developer will.)

You can optionally refund only part of a charge. You can do so as many times as you wish until the entire charge has been refunded.

Once entirely refunded, a charge can't be refunded again. This method will return an error when called on an already-refunded charge, or when trying to refund more money than is left on a charge.

Arguments i. Id (required): The identifier of the charge to be refunded.

ii. Amount (optional, default is entire charge): A positive integer in cents representing how much of this charge to refund. Can only refund up to the unrefunded amount remaining of the charge.

Returns

Returns the charge object if the refund succeeded. Returns an error if the charge has already been refunded or an invalid charge identifier was provided.

List all Charges

Returns a list of charges you've previously created. The charges are returned in sorted order, with the most recent charges appearing first.

Like with an individual charge, you can see the list of charges directly in your browser.

https://vtUQeOtUnYr7PGCLQ96U14zqpDUO4sOE@api.stripe.com/v1/charges

Arguments i. Count (optional, default is 10): A limit on the number of charges to be returned. Count can range between 1 and 100 charges.

ii. Offset (optional, default is 0): An offset into your charge array. The API will return the requested number of charges starting at that offset.

iii. Customer (optional): Only return charges for the customer specified by this customer id.

Returns

A dictionary with a data property that contains an array of up to count charges, starting at index offset. Each entry in the array is a separate charge object. If no more charges are available, the resulting array will be empty. If you provide a non-existent customer ID, an error will be returned.

G. Customers

Customer objects allow you to perform recurring charges and track multiple charges that are associated with the same customer. The API allows you to create, delete, and update your customers. You can retrieve individual customers as well as a list of all your customers.

Creating a New Customer

Creates a new customer object.

Arguments i. Card (optional, default is null): A card to attach to the customer. The card can either be a token, like the ones returned by our stripe.js, or a dictionary containing a user's credit card details, with the options described below. Whenever you attach a card to a customer, Stripe will automatically validate the card. A customer with a card can be used when creating a charge or put on a recurring billing plan.

a. Number (required): The card number, as a string without any separators.

b. exp_month (required): Two digit number representing the card's expiration month.

c. exp_year (required): Four digit number representing the card's expiration year.

d. Cvc (optional, highly recommended): Card security code e. Name (optional, recommended): Cardholder's full name.

f. address_line1 (optional, recommended)

g. address_line2 (optional, recommended)

h. address_zip (optional, recommended)

i. address_state (optional, recommended)

j. address_country (optional, recommended)

ii. Coupon (optional, default is null): If you provide a coupon code, the customer will have a discount applied on all recurring charges. Charges you create through the API will not have the discount. You can manage your coupons in the coupon section of your account.

iii. Email (optional, default is null): The customer's email address. It is displayed alongside the customer in the web interface and can be useful for searching and tracking.

iv. Description (optional, default is null): An arbitrary string which you can attach to a customer object. It is displayed alongside the customer in the web interface.

v. Plan (optional, default is null): The identifier of the plan to subscribe the customer to. If provided, the returned customer object has a 'subscription' attribute describing the state of the customer's subscription.

vi. Trial_end (optional, default is null): UTC integer timestamp representing the end of the trial period the customer will get before being charged for the first time. If set, trial_end will override the default trial period of the plan the customer is being subscribed to.

Returns

Returns a customer object if the call succeeded. The returned object will have information about subscriptions, discount, and cards, if that information has been provided. If a non-free plan is specified and a card is not provided, the call will return an error. If a non-existent plan or a non-existent or expired coupon is provided, the call will return an error.

If a card has been attached to the customer, the returned customer object will have an active_card attribute containing the card's details.

Retrieving a Customer

Retrieves the details of an existing customer. You need only supply the unique customer identifier that was returned upon customer creation.

Like with a charge, you can view the retrieved customer directly in your browser.
https://vtUQeOtUnYr7PGCLQ96U14zqpDUO4sOE@api.stripe.com/v1/customers/ch_qcndYXT K13AsZj Arguments Id (required): The identifier of the customer to be retrieved.

Returns

Returns a customer object if a valid identifier was provided. When requesting the ID of a customer that has been deleted, a subset of the customer's information will be returned, including a "deleted" property, which will be true.

Updating a Customer

Updates the specified customer by setting the values of the parameters passed. Any parameters not provided will be left unchanged. For example, if you pass the card parameter, that becomes the customer's active card which will be used for all charges in future.

This request accepts mostly the same arguments as the customer creation call. However, subscription-related arguments (plan and trial_end) are not accepted. To change those, one must update the customer's subscription directly.

Arguments i. Card (optional, default is null): A new card to attach to the customer. The card can either be a token, like the ones returned by our stripe.js, or a dictionary containing a user's credit card details, with the options described below. A customer with a card can be used when creating a charge or put on a recurring billing plan. Although not all information is required, the extra info helps prevent fraud.
  a. Number (required): The card number, as a string without any separators.
  b. exp_month (required): Two digit number representing the card's expiration month.
  c. exp_year (required): Four digit number representing the card's expiration year.
  d. Cvc (optional, highly recommended): Card security code
  e. Name (optional, recommended): Cardholder's full name.
  f. address_line1 (optional, recommended)
  g. address_line2 (optional, recommended)
  h. address_zip (optional, recommended)
  i. address_state (optional, recommended)
  j. address_country (optional, recommended)

ii. Coupon (optional, default is null): If you provide a coupon code, the customer will have a discount applied on all recurring charges. Charges you create through the API will not have the discount. You can manage your coupons in the coupon section of your account.

iii. Description (optional, default is null): An arbitrary string which you can attach to a customer object. It is displayed alongside the customer in the web interface.

iv. Email (optional, default is null): The customer's email address. It is displayed alongside the customer in the web interface and can be useful for searching and tracking.

Returns

Returns the customer object if the update succeeded. Errors will be thrown if update parameters are invalid. For example, specifying an invalid coupon or an invalid card will return an error.

Deleting a Customer

Permanently deletes a customer. It cannot be undone.

Arguments

Id (required): The identifier of the customer to be deleted.

Returns

Returns an object with a deleted parameter on success. If the customer id does not exist, an error is returned.

Unlike other objects, deleted customers can still be retrieved through the API, in order to be able to track the history of customers while still removing their credit card details and preventing any further operations to be performed (such as adding a new subscription).

List all Customers

Returns a list of your customers. The customers are returned sorted by creation date, with the most recently created customers appearing first.

Like with an individual customer, you can view the list of customers directly in your browser.
https://vtUQeOtUnYr7PGCLQ96U14zqpDUO4sOE@api.stripe.com/v1/customers Arguments i. Count (optional, default is 10): A limit on the number of customers to be returned. Count can range between 1 and 100 charges.

ii. Offset (optional, default is 0): An offset into your customer array. The API will return the requested number of customers starting at that offset.

Returns

A dictionary with a data property that contains an array of up to count customers, starting at index offset. Each entry in the array is a separate customer object. If no more customers are available, the resulting array will be empty. This request should never return an error.

H. Card Tokens

Often you want to be able to charge credit cards without having to hold sensitive card information on your own servers. stripe.js makes this easy in the browser, but you can use the same technique in other environments with our card token API.

Card tokens can be created with your publishable API key, which can safely be embedded in downloadable applications like iPhone and Android apps.

Creating a Card Token

Creates a single use token that wraps the details of a credit card. This token can be used in place of a credit card dictionary with any API method. These tokens can only be used once: by creating a new charge object, or attaching them to a customer.

Arguments i. Card (required, default is null): The card details this token will represent.
  a. Number (required): The card number, as a string without any separators.

b. exp_month (required): Two digit number representing the card's expiration month.
c. exp_year (required): Four digit number representing the card's expiration year.
d. Cvc (optional, highly recommended): Card security code
e. Name (optional, recommended) Cardholder's full name.
f. address_line1 (optional, recommended)
g. address_line2 (optional, recommended)
h. address_zip (optional, recommended)
i. address_state (optional, recommended)
j. address_country (optional, recommended)

ii. amount (optional): An integer amount in cents. If provided, the returned token will guarantee that there are enough funds to satisfy a charge for this amount.

iii. Currency (optional) 3-letter ISO code for currency. Currently, only 'usd' is supported.

Returns

The created card token object is returned if successful, otherwise an error is returned.

Retrieving a Card Token

Retrieves the card token with the given id.

I. Plans

A subscription plan contains the pricing information for different products and feature levels on your site. For example, you might have a $10/month plan for basic features and a different $20/month plan for premium features.

Creating Plans

You can create plans easily via the plan management page of the Stripe management interface. Plan creation is also accessible via the API if you need to create plans on the fly.

Parameters i. Id (required): Unique string of your choice that will be used to identify this plan when subscribing a customer. This could be an identifier like "gold" or a primary key from your own database.

ii. Amount (required): A positive integer in cents (or 0 for a free plan) representing how much to charge (on a recurring basis) currencyrequired3-letter ISO code for currency. Currently, only 'usd' is supported.

iii. Interval (required): Specifies billing frequency. Either month or year.

iv. Name (required): Name of the plan, to be displayed on invoices and in the web interface.

v. trial_period_days (optional): Specifies a trial period in (an integer number of) days. If you include a trial period, the customer won't be billed for the first time until the trial period ends. If the customer cancels before the trial period is over, she'll never be billed at all.

Retrieving a Plan

Retrieves the plan with the given id.

Arguments

Id (required): The id of the desired plan.

Returns

Returns a plan if a valid plan id was provided. Returns an error otherwise.

Deleting a Plan

You can delete plans via the plan management page of the Stripe management interface. However, deleting a plan does not affect any current subscribers to the plan; it merely means that new subscribers can't be added to that plan. You can also delete plans via the API.

Arguments

Id (required): The identifier of the plan to be deleted.

Returns

An object with the deleted plan's id and a deleted flag upon success. An error is returned otherwise, such as if the plan has already been deleted.

List all Plans

Returns a list of your plans.

Arguments i. Count (optional, default is 10): A limit on the number of plans to be returned. Count can range between 1 and 100 items.

ii. Offset (optional, default is 0): An offset into your plans array. The API will return the requested number of plans starting at that offset.

Returns

A dictionary with a data property that contains an array of up to count plans, starting at index offset. Each entry in the array is a separate plan object. If no more plans are available, the resulting array will be empty. This request should never return an error.

J. Subscriptions

Subscriptions allow you to charge a customer's card on a recurring basis. A subscription ties a customer to a particular plan you've created.

Updating the Customer's Active Subscription

Subscribes a customer to a plan, meaning the customer will be billed monthly starting from signup. If the customer already has an active subscription, we'll update it to the new plan and optionally prorate the price we charge next month to make up for any price changes.

Arguments i. Plan (required): The identifier of the plan to subscribe the customer to.

ii. Coupon (optional, default is null): The code of the coupon to apply to the customer if you would like to apply it at the same time as creating the subscription.

iii. Prorate (optional, default is true): Flag telling us whether to prorate switching plans during a billing cycle iv. trial_end (optional, default is null): UTC integer timestamp representing the end of the trial period the customer will get before being charged for the first time. If set, trial_end will override the default trial period of the plan the customer is being subscribed to.

v. Card (optional, default is null): A new card to attach to the customer. The card can either be a token, like the ones returned by our stripe.js, or a dictionary containing a user's credit card details, with the options described below. You must provide a card if the customer does not already have a valid card attached, and you are subscribing the customer for a plan that is not free. Although not all information is required, the extra info helps prevent fraud.

a. Number (required): The card number, as a string without any separators.
b. exp_month (required): Two digit number representing the card's expiration month.
c. exp_year (required): Four digit number representing the card's expiration year.
d. Cvc (optional, highly recommended): Card security code
e. Name (optional, recommended): Cardholder's full name.
f. address_line1 (optional, recommended):
g. address_line2 (optional, recommended):
h. address_zip (optional, recommended):
i. address_state (optional, recommended):
j. address_country (optional, recommended):

By default, we prorate subscription changes. For example, if a customer signs up on May 1 for a $10 plan, she'll be billed $10 immediately. If she then switches to a $20 plan on May 15, on June 1 she'll be billed $25 ($20 for a renewal of her subscription and a $5 prorating adjustment for the previous month.) If you don't want to prorate, set the prorate option to false and the customer would be billed $10 on May 1 and $20 on June 1.

Returns

The newly created subscription object if the call succeeded.

The subscription object has a 'status' attribute with the following possible values: trialing, active, past_due, canceled, or unpaid. A subscription still in its trial period is 'trialing' and moves to 'active' when the trial period is over. When payment to renew the subscription fails, the subscription becomes 'past_due.' After Stripe has exhausted all payment retry attempts, the subscription ends up with a status of either 'canceled' or 'unpaid' depending on your retry settings.

If the specified plan is not free and either the customer has no card or the attempted charge fails, an error will be returned.

Canceling a Customer's Subscription

Cancels the subscription if it exists. If you set the at_period_end parameter to true, the subscription will remain active until the end of the period, at which point it will be cancelled and not renewed. By default, the subscription is terminated immediately. In either case, the customer will not be charged again for the subscription. Note, however, that any pending invoice items will still be charged for at the end of the period unless manually deleted.

Arguments at_period_end (optional, default is false): A flag that if set to true will delay the cancellation of the subscription untill the end of the current period.

Returns

The canceled subscription object. Its subscription status will be set to "canceled".

K. Invoice items

Sometimes you want to add a charge or credit to a customer but only actually charge the customer's card at the end of a regular billing cycle. This is useful for combining several charges to minimize per-transaction fees or having Stripe tabulate your usage-based billing totals.

Creating an Invoice Item

Adds an arbitrary charge or credit to the customer's upcoming invoice.

Arguments i. Customer (required): The id of the customer who will be billed when this invoice item is billed.

ii. Amount (required): The integer amount in cents of the charge to be applied to the upcoming invoice. If you want to apply a credit to the customer's account, pass a negative amount.

iii. Currency (required): 3-letter ISO code for currency. Currently, only 'usd' is supported.

iv. Description (optional, default is null): An arbitrary string which you can attach to the invoice item. The description is displayed in the invoice for easy tracking.

Returns

The created invoice item object is returned if successful. Otherwise an error is returned.

Retrieving an Invoice Item

Retrieves the invoice item with the given id.

Returns

Returns an invoice if a valid invoice id was provided. Returns an error otherwise.

Updating an Invoice Item

Updates the amount or description of an invoice item on an upcoming invoice. Updating an invoice item is only possible before the invoice it's attached to is closed.

Arguments i. Amount (required): The integer amount in cents of the charge to be applied to the upcoming invoice. If you want to apply a credit to the customer's account, pass a negative amount.

ii. Currency (required): 3-letter ISO code for currency. Currently, only 'usd' is supported.

iii. Description (optional): An arbitrary string which you can attach to the invoice item. The description is displayed in the invoice for easy tracking.

Returns

The updated invoice item object is returned upon success. Otherwise an error is returned.

Deleting an Invoice Item

Removes an invoice item from the upcoming invoice. Removing an invoice item is only possible before the invoice it's attached to is closed.

Arguments

Id (required): The identifier of the invoice item to be deleted.

Returns

An object with the deleted invoice item's id and a deleted flag upon success. An error is returned otherwise, such as if the invoice item has already been deleted.

List all Invoice Items

Returns a list of your invoice items. Invoice Items are returned sorted by creation date, with the most recently created invoice items appearing first.

Arguments i. Customer (optional): The identifier of the customer whose invoice items to return. If none is provided, all invoice items will be returned.

ii. Count (optional, default is 10): A limit on the number of invoice items to be returned. Count can range between 1 and 100 items.

iii. Offset (optional, default is 0): An offset into your invoice items array. The API will return the requested number of invoice items starting at that offset.

Returns

A dictionary with a data property that contains an array of up to count invoice items, starting at index offset. Each entry in the array is a separate invoice item object. If no more invoice items are available, the resulting array will be empty. This request should never return an error.

L. Invoices

Invoices are statements of what a customer owes for a particular billing period, including subscriptions, invoice items, and any automatic proration adjustments if necessary.

Once an invoice is created, payment is automatically attempted. Note that the payment, while automatic, does not happen exactly at the time of invoice creation (though it usually takes place within a few hours).

Retrieving an Invoice

Retrieves the invoice with the given id.

Arguments

Id (required): The identifier of the desired invoice.

Returns

Returns an invoice object if a valid invoice id was provided. Returns an error otherwise.

The invoice object contains a lines hash that contains information about the subscriptions and invoice items that have been applied to the invoice, as well as any prorations that Stripe has automatically calculated. Each line on the invoice has an amount attribute that represents the amount actually contributed to the invoice's total. For invoice items and prorations, the amount attribute is the same as for the invoice item or proration respectively. For subscriptions, the amount may be different from the plan's regular price depending on whether the invoice covers a trial period or the invoice period differs from the plan's usual interval.

The invoice object has both a subtotal and a total. The subtotal represents the total before any discounts, while the total is the final amount to be charged to the customer after all coupons have been applied.

Retrieving a List of Invoices

You can list all invoices, or list the invoices for a specific customer.

Arguments i. Customer (optional): The identifier of the customer whose invoices to return. If none is provided, all invoices will be returned.

ii. Count (optional, default is 10): A limit on the number of invoices to be returned. Count can range between 1 and 100 invoices.

iii. Offset (optional, default is 0): An offset into your invoices array. The API will return the requested number of invoices starting at that offset.

Returns

A dictionary with a data property that contains an array of invoice objects. No errors are expected.

Retrieving a Customer's Upcoming Invoice

At any time, you can view the upcoming invoice for a customer. This will show you all the charges that are pending, including subscription renewal charges, invoice item charges, etc. It will also show you any discount that is applicable to the customer.

Arguments

Customer (required): The identifier of the customer whose upcoming invoice you'd like to retrieve.

Returns

Returns an invoice if a valid customer id was provided. Returns an error otherwise.

M. Coupons

A coupon contains information about a percent-off discount you might want to apply to a customer.

Creating Coupons

You can create coupons easily via the coupon management page of the Stripe management interface. Coupon creation is also accessible via the API if you need to create coupons on the fly.

Parameters i. Id (optional): Unique string of your choice that will be used to identify this coupon when applying it a customer. This is often a specific code you'll give to your customer to use when signing up (e.g. FALL25OFF). If you don't want to specify a particular code, you can leave the id blank and we'll generate a random code for you.

ii. percent_off (required): A positive integer between 1 and 100 that represents the discount the coupon will apply.

iii. Duration (required): Specifies how long the discount will be in effect. Can be forever, once, or repeating.

iv. duration_in_months (optional, required only if duration is repeating): If duration is repeating, a positive integer that specifies the number of months the discount will be in effect.

v. max_redemptions (optional): A positive integer specifying the number of times the coupon can be redeemed before it's no longer valid. For example, you might have a 50% off coupon that the first 20 readers of your blog can use.

vi. redeem_by (optional): UTC timestamp specifying the last time at which the coupon can be redeemed. After the redeem_by date, the coupon can no longer be applied to new customers.

Retrieving a Coupon

Retrieves the coupon with the given id.

Arguments

Id (required): The id of the desired coupon.

Returns

Returns a coupon if a valid coupon id was provided. Returns an error otherwise.

Deleting a Coupon

You can delete coupons via the coupon management page of the Stripe management interface. However, deleting a coupon does not affect any customers who have already applied the coupon; it means that new customers can't redeem the coupon. You can also delete coupons via the API.

Arguments

Id (required): The identifier of the coupon to be deleted.

Returns

An object with the deleted coupon's id and a deleted flag upon success. An error is returned otherwise, such as if the coupon has already been deleted.

List all Coupons

Returns a list of your coupons.

Arguments i. Count (optional, default is 10): A limit on the number of coupons to be returned. Count can range between 1 and 100 items.

ii. Offset (optional, default is 0): An offset into your coupons array. The API will return the requested number of coupons starting at that offset.

Returns

A dictionary with a data property that contains an array of up to count coupons, starting at index offset. Each entry in the array is a separate coupon object. If no more coupons are available, the resulting array will be empty. This request should never return an error.

N. Webhooks

Stripe uses WebHooks to notify users of events that occur asynchronously. (A WebHook is basically just a callback via HTTP POST.) The only WebHook that takes a response is "Invoice Ready".

The URL that will be polled can be specified in your account settings. You can specify separate live and test URLs. A webhook request has a single POST param called "json". The value of this param is a JSON dictionary which has an event entry indicating the event's type.

Note: Stripe ensures that webhooks are sent successfully but does not attempt to re-send webhooks that return errors in the response.

Failed Recurring Payment

When a customer has a subscription, Stripe attempts to charge his credit card each month. If this charge fails, Stripe notifies you of this failure. This hook can be used to automatically change the state of the customer's account, e.g. to display a banner reminding him to update his payment information.

Parameters i. Customer: id of the customer the webhook is related to ii. Invoice: Details about the invoice the payment was for iii. Attempt: Attempt count this payment represents (automatic attempts to pay this invoice). For the first failed payment attempt the attempt count will be 1, for the second 2, etc. This count does not include manual attempts you make to retry the payment from the management interface.

iv. Payment: Details about the attempted payment a. Card: Details about the card that Stripe could not charge successfully.

I. Type: The brand of the card (e.g. Visa, MasterCard,).

II. last4: The last 4 digits of the card.

b. Time: Time the payment was attempted c. Success: Payment success or failure

Invoice Ready

Each month, when Stripe has calculated the next charge for a customer, Stripe sends a notification informing you of the amount to be charged as well as the individual lines that make up the invoice (e.g. a subscription renewal, individual invoice items added to the invoice during the usage period, etc.). At that time you have the opportunity to add invoice items to the invoice by responding to the webhook.

You can also add invoice items to the bill separately from the webhook response, but only until the invoice freezes and attempts to collect payment, which happens ~1 hour after the invoice_ready webhook is sent.

The invoice ready notification is very useful for implementing usage-based billing as part of your pricing scheme. For example, if we send you a notification for the usage period between March 1 and April 1, you can tally bandwidth usage during this period of time and send us a response with the total additional usage fees to apply to the invoice.

Use the invoice's period_start and period_end parameters to calculate any usage-based billing for the usage period the invoice covers. Note that the subscription renewal line on the invoice has a period for the renewed subscription. Because subscriptions are pre-billed, the usage period does not align with the subscription's current period (the period through which it's paid).

Response

If you want to add charges or credits to the invoice before Stripe attempts to collect payment for it, you can simply respond with a JSON hash that includes an invoiceitems parameter.

i. Customer: The ID of the customer in question.

ii. Invoice: A hash representing the invoice, with the following parameters.

a. Total: The total amount that will be charged to the customer's card, including all subscriptions, invoice items, and discounts.

b. Subtotal: The amount to be billed, excluding discounts. Will be the same as the total if no discounts have been applied.

c. Invoiceitems: Array of hashes representing each item.

d. Subscriptions: Array of hashes representing each subscription.

e. Discount: Hash describing any discount or coupon applied.

f. Date: A timestamp indicating when the invoice was calculated.

g. period_start: A timestamp indicating the beginning of the billing cycle.

h. period_end: A timestamp indicating the end of the billing cycle.

Successful Recurring Payment

When a customer has a subscription, Stripe attempts to charge the customer's credit card each month. When this charge succeeds as expected, Stripe sends a notification with the details of the successful charge. You can use this webhook for performing actions such as emailing your customer with an invoice.

Parameters i. Customer: id of the customer the webhook is related to ii. Invoice: Details about the invoice the payment was for iii. Payment: Details about the attempted payment a. Card: Details about the card that Stripe successfully charged.

I. Type: The brand of the card (e.g. Visa, MasterCard,).

II. last4: The last 4 digits of the card.

b. Time: Time the payment was attempted c. Success: Payment success or failure

Trial Ending

If a customer is subscribed to a plan with a free trial, Stripe sends a webhook notifying you 3 days before the trial is about to end and the card is about to be charged for the first time. This gives you the opportunity to email the customer or take some other action.

Parameters i. Customer: id of the customer the webhook is related to ii. Subscription: Details about the subscription whose trial is about to end.

a. Plan: Details of the plan the customer has subscribed to.

I. Name: Name given to the plan

II. Id: Unique identifier of the plan

III. Amount: Price in cents of the plan

IV. Interval: Recurring interval of subscription

V. trial_period_days: Duration in days of the trial period b. trial_start: When the customer signed up for the subscription c. trial_end: End of trial period Subscription Final Payment Attempt Stripe automatically handles failed payments for you. We retry a failed payment up to 3 times, and if we still can't collect payment, we take a final action that you specify. By default we'll cancel the subscription for you and stop attempting to invoice or charge the customer, but if you choose we can merely mark the subscription unpaid and continue to invoice but not attempt payment. In either case, we'll notify you when the maximum failed payment attempts have been reached so that you know when a subscription has been canceled or marked unpaid.

Parameters i. customer: id of the customer the webhook is related to ii. subscription: Dictionary of the subscription object. The status of the subscription will reflect whether it is canceled or unpaid, which is determined based on your preferences.

Ping

When testing your webhook configuration, Stripe may send a ping, either at your request or to verify that a connection can be made. These requests can be safely ignored. Stripe looks for a 200 HTTP status and ignores the remainder of the response.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A method for conducting a transaction between a network site and an electronic device of a user, the method comprising:

creating a token through use of cross-origin communication between a client-side application on the electronic device and a third-party server in response to submission of a form by the user from the client-side application of the electronic device to a server-side application of a server of the network site, wherein creating the token through the use of cross-origin communication includes receiving an input from the user to start submission of the form from the client-side application to the server-side application, setting up a communication pathway to the third-party server as part of the cross-origin communication in response to starting submission of the form from the client-side application to the server-side application, sending user payment information to the third-party server using the communication pathway and having the third-party server generate the token using the payment information, without requiring any previous interaction between the user and the third-party server, receiving, over the communication pathway, the token for use in completing the transaction, and sending, without further user action, the token received from the third-party server to the server-side application as part of completing submission of the form to the server-side application; and sending the token, after creation and without intervention by the user, to the server of the network site in response to the submission of the form, the token being used to charge the user of the electronic device as part of completing the transaction.

2. The method defined in claim 1 wherein setting up the secure network communication tunnel comprises creating and communicating with an iframe.

3. The method defined in claim 1 wherein creating the token to complete the transaction through use of cross-origin communication comprises performing a JSONP request from the client-side application to the third-party server.

4. The method defined in claim 1 wherein creating the token occurs only in response to verifying validity of a publishable, non-secret key sent from the client-side application in the cross-origin communication in response to submission of the form.

5. The method defined in claim 1 wherein the token is a proxy for payment information.

6. The method defined in claim 1 wherein the token is for use in charging a credit card of the user.

7. The method defined in claim 1 wherein creating the token comprises:
receiving a first request to create the token;
detecting payment information of the user sent with the request;
obtaining an identifier associated with the payment information;
sending a second request to a token generating application, the second request including the identifier substituted for the payment information;
generating the token in response to the second request with the identifier; and
returning the token to the client-side application for submission to the third-party server with the form.

8. The method defined in claim 7 further comprising:
receiving the token at the server-side application; and
sending, by the server-side application, the token and a secret key to a payment processor.

9. The method defined in claim 8 further comprising authorizing, by the payment processor, the transaction if the secret key is valid and associated with the merchant.

10. The method defined in claim 7 wherein the payment information comprises an account number associated with the user.

11. The method defined in claim 7 further comprising encrypting the payment information and comparing encrypted payment information with data stored in a database.

12. A network arrangement for conducting a transaction, the network arrangement comprising:
a network site having a network site server, the network site server having a server side application;
an electronic device of a user communicably coupled to the network site for conducting the transaction between the network site and the electronic device, wherein the electronic device includes a client-side application; and
a third-party server communicably coupled with the electronic device, the third-party server being operable to create a token through use of cross-origin communication between the client-side application on the electronic device and the third-party server in response to submission of a form by the user from the client-side application of the electronic device to the server-side application of the network site server, wherein the token is sent, after creation and without intervention by the user, to the network site server in response to the submission of the form for use in charging the user of the electronic device as part of completing the transaction, wherein the token is created through the use of cross-origin communication by
receiving an input from the user to start submission of the form from the client-side application to the server-side application,
setting up a communication pathway to the third-party server as part of the cross-origin communication in response to starting submission of the form from the client-side application to the server-side application,
sending user payment information to the third-party server using the communication pathway and having the third-party server generate the token using the payment information, without requiring any previous interaction between the user and the third-party server,
receiving, over the communication pathway, the token for use in completing the transaction, and
sending, without further user action, the token received from the third-party server to the server-side application as part of completing submission of the form to the server-side application.

13. An article of manufacture having one or more non-transitory computer readable media storing instructions which, when executed by an electronic device of a user, a network site server and a third-party server of a network arrangement, cause the network arrangement to perform a method for conducting a transaction between a network site and the electronic device of the user, the method comprising:
creating a token through use of cross-origin communication between a client-side application on the electronic device and a third-party server in response to submission of a form by the user from the client-side application of the electronic device to a server-side application of a server of the network site, wherein creating the token through the use of cross-origin communication includes
receiving an input from the user to start submission of the form from the client-side application to the server-side application,
setting up a communication pathway to the third-party server as part of the cross-origin communication in response to starting submission of the form from the client-side application to the server-side application,
sending user payment information to the third-party server using the communication pathway and having the third-party server generate the token using the payment information, without requiring any previous interaction between the user and the third-party server,
receiving, over the communication pathway, the token for use in completing the transaction, and
sending, without further user action, the token received from the third-party server to the server-side application as part of completing submission of the form to the server-side application; and
sending the token, after creation and without intervention by the user, to the server of the network site in response to the submission of the form, the token being used to charge the user of the electronic device as part of completing the transaction.

14. A method for conducting one or more transactions between an electronic device of a user and a network site using network communication, the method comprising:
receiving, at a server of the network site, from a client side application executing on the electronic device, a single use token associated with a user as part of a transaction, the token being generated in response to submission of information using the client-side application only after verifying validity of a publishable, non-secret key sent from the client-side application, wherein the single use token is generated by receiving an input from the user using the client side application to start submission of the form from the client-side application to the server-side application, setting up a communication pathway to a third-party server as part of cross-origin communication in response to starting submission of the form from the client-side application to the server-side application, sending user payment information entered in the form to the third-party server using the communication pathway and having the third-party server generate the token using the payment information, without requiring any previous interaction between the user and the third-party server, receiving, over the communication pathway, the single use token, and sending, without further user action, the single use token received from the third-party server to the server-side application as part of completing submission of the form to the server-side application;

sending, by a server-side application running on the server of the network site, the token and a secret key to a processor remotely located with respect to the electronic device; and charging the user, using the single use token, as part of completing the transaction, including authorizing, by the processor, the transaction after the processor determines the second key is valid and is associated with the network site.

15. The method defined in claim 14 further comprising creating the token by:

receiving a first request to create the token in response to submission of a form by a user from the client-side application to the server-side application of the server of the network site;

detecting the information of the user sent with the request;

forwarding a second request to a token generating application with an identifier substituted for the information;

generating the token in response to the second request with the identifier; and returning the token to the client-side application for submission to the server of the network site with the form.

16. The method defined in claim 14 further comprising creating the token by:

receiving a first request to create the token in response to submission of a form by a user from the client-side application to the server-side application of the server of the network site;

detecting information of the user sent with the request;

obtaining an identifier associated with the information;

sending a second request to a token generating application, the second request including the identifier substituted for the information;

generating the token in response to the second request with the identifier; and returning the token to the client-side application for submission to the server of the network site with the form.

17. The method defined in claim 14 wherein the information comprises payment information.

18. The method defined in claim 14 wherein the information comprises an account number associated with the user.

19. The method defined in claim 14 wherein checking the database comprises encrypting the information and compared encrypted payment information with data stored in the database.

20. The method defined in claim 14 further comprising:

receiving, by the processor, a charge request with the token and the secret key;

replacing the token with a first card number;

creating a charge; and sending a response with a charge token to the server of the network site.

21. The method defined in claim 14 further comprising:

receiving, by the processor, a charge request with the token and the secret key;

replacing the token with a first card number;

replacing the first card number with a second account number, the second account number being the primary account number;

validating, using the processor, the primary account number;

replacing the primary account number with the first card number; and sending a response with a charge token to the server of the network site.

* * * * *